US011228473B2

(12) United States Patent
Yang et al.

(10) Patent No.: US 11,228,473 B2
(45) Date of Patent: *Jan. 18, 2022

(54) SIGNAL GENERATION USING LOW PEAK-TO-AVERAGE POWER RATIO BASE SEQUENCES

(71) Applicant: QUALCOMM Incorporated, San Diego, CA (US)

(72) Inventors: Wei Yang, San Diego, CA (US); Renqiu Wang, San Diego, CA (US); Yi Huang, San Diego, CA (US); Seyong Park, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/203,283

(22) Filed: Nov. 28, 2018

(65) Prior Publication Data

US 2019/0165979 A1 May 30, 2019

Related U.S. Application Data

(60) Provisional application No. 62/592,313, filed on Nov. 29, 2017.

(51) Int. Cl.
*H04L 5/00* (2006.01)
*H04W 52/02* (2009.01)
(Continued)

(52) U.S. Cl.
CPC ........ *H04L 27/2614* (2013.01); *H04L 5/0044* (2013.01); *H04L 5/0048* (2013.01);
(Continued)

(58) Field of Classification Search
None
See application file for complete search history.

(56) References Cited

U.S. PATENT DOCUMENTS 10,298,376 B2 * 5/2019 Han .................... H04L 27/2613
2009/0046702 A1 * 2/2009 Luo ..................... H04J 11/0069
370/350

(Continued)

OTHER PUBLICATIONS

Huawei et al., "Design of UL DMRS Sequence for Data Transmission", 3GPP Draft, R1-1720635, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 17, 2017 (Nov. 17, 2017), XP051369254, 11 Pages, Retrieved from the Internet: URL:http://www.3gpp.org/ftp/tsg%5Fran/WG1%5FRL1/TSGR1%5F91/Docs/ [retrieved on Nov. 17, 2017], Section 3.

(Continued)

*Primary Examiner* — Duc T Duong
(74) *Attorney, Agent, or Firm* — Qualcomm Incorporated

(57) ABSTRACT

In an aspect of the disclosure, a method, a computer-readable medium, and an apparatus are provided. The apparatus may determine a UE. The apparatus may generate a reference signal using a base sequence obtained from a table, the table including a plurality of base sequences that each have a peak-to-average-power ratio (PAPR) metric below a threshold. Then, the apparatus transmits the reference signal to a base station. The reference signal may be multiplexed with a data transmission.

45 Claims, 14 Drawing Sheets

(51) Int. Cl.
*H04L 27/26* (2006.01)
*H04W 4/06* (2009.01)
*H04L 7/04* (2006.01)
*H04W 72/04* (2009.01)

(52) U.S. Cl.
CPC ............ *H04L 5/0051* (2013.01); *H04L 7/042* (2013.01); *H04L 27/262* (2013.01); *H04L 27/2607* (2013.01); *H04L 27/2613* (2013.01); *H04W 4/06* (2013.01); *H04W 72/044* (2013.01); *H04L 5/001* (2013.01)

(56) References Cited

U.S. PATENT DOCUMENTS

| | | | |
|---|---|---|---|
| 2009/0103639 A1* | 4/2009 | Sankabathula | H04L 27/2618 375/260 |
| 2011/0199889 A1 | 8/2011 | Han et al. | |
| 2011/0228818 A1* | 9/2011 | Hirama | H04B 1/707 375/146 |
| 2011/0249548 A1 | 10/2011 | Gaal et al. | |
| 2012/0039198 A1* | 2/2012 | Yang | H04L 27/2615 370/252 |
| 2013/0230120 A1* | 9/2013 | Yang | H04L 27/2613 375/295 |
| 2013/0315169 A1* | 11/2013 | Porat | H04L 27/2621 370/329 |
| 2014/0153507 A1* | 6/2014 | Yang | H04L 27/2602 370/329 |
| 2015/0333947 A1* | 11/2015 | Ling | H04L 27/2614 375/295 |
| 2016/0191110 A1* | 6/2016 | Brecher | H04L 27/3411 375/295 |
| 2018/0241603 A1* | 8/2018 | Jia | H04L 25/03834 |
| 2019/0149379 A1* | 5/2019 | Xiong | H04L 27/2613 370/329 |
| 2019/0150175 A1* | 5/2019 | Qu | H04W 72/1231 370/329 |
| 2019/0166592 A1 | 5/2019 | Yang et al. | |
| 2019/0215122 A1* | 7/2019 | Gong | H04W 72/0413 |
| 2020/0028723 A1* | 1/2020 | Gao | H04W 72/042 |
| 2020/0274630 A1* | 8/2020 | Liang | H04L 27/2692 |

OTHER PUBLICATIONS

International Search Report and Written Opinion—PCT/US2018/063046—ISA/EPO—dated Mar. 14, 2019.

Qualcomm Incorporated: "Remaining Issues on DMRS Design," 3GPP Draft; R1-1720668 DMRS, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 18, 2017, XP051370129, 24 pages, Retrieved from the Internet: URL: http://www.3gpp.org/ftp/tsg%5Fran/WG1%5FRL1/TSGR1%5F91/Docs/ [retrieved on Nov. 18, 2017].

"3rd Generation Partnership Project; Technical Specification Group Radio Access Network; NR; Physical channels and modulation (Release 15)", 3GPP Standard; TS 38.211, vol. RAN WG1, No. V15.0.0,2017, pp. 1-73, XP051392260.

ETSI: TS 136 211 V14.2.0 (Apr. 2017) (Year: 2017).

* cited by examiner

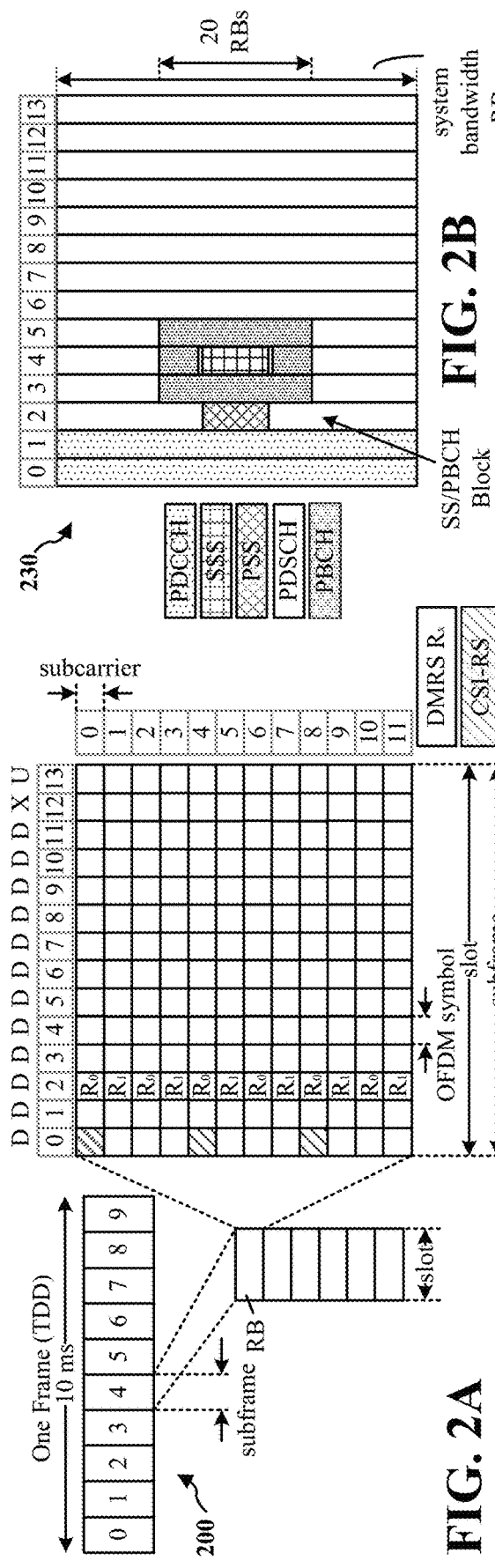
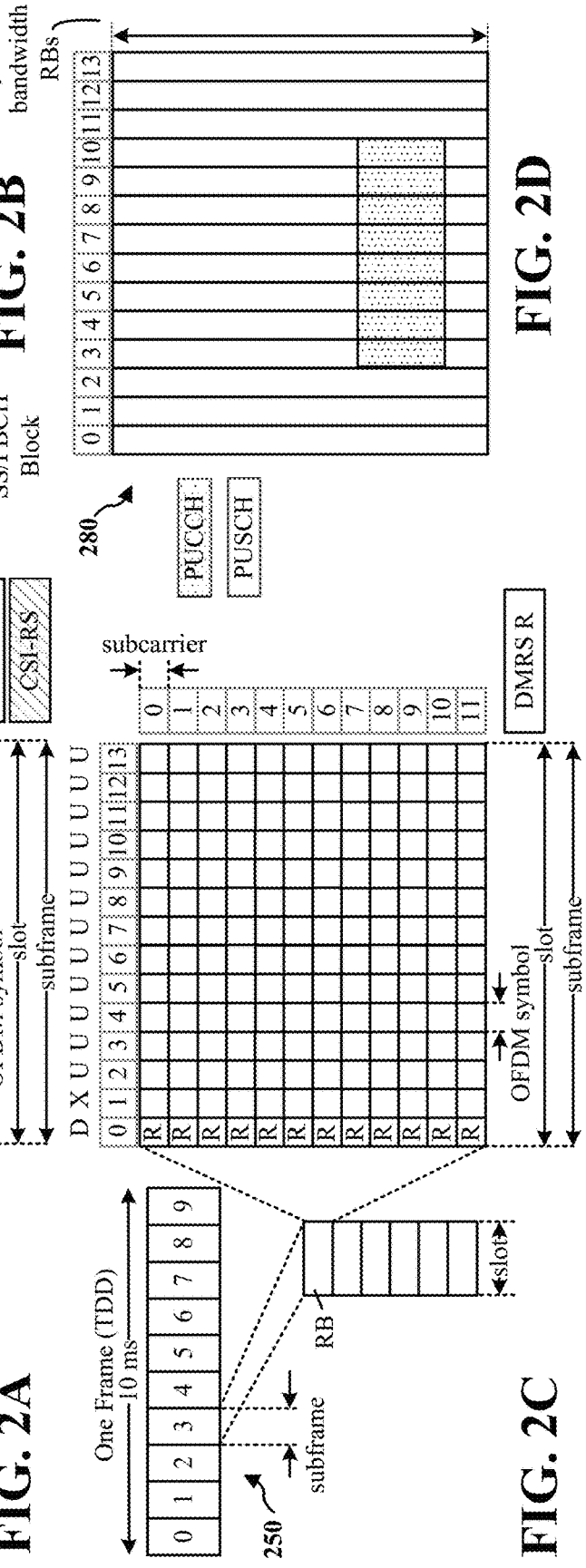
FIG. 2A  FIG. 2B  FIG. 2C  FIG. 2D

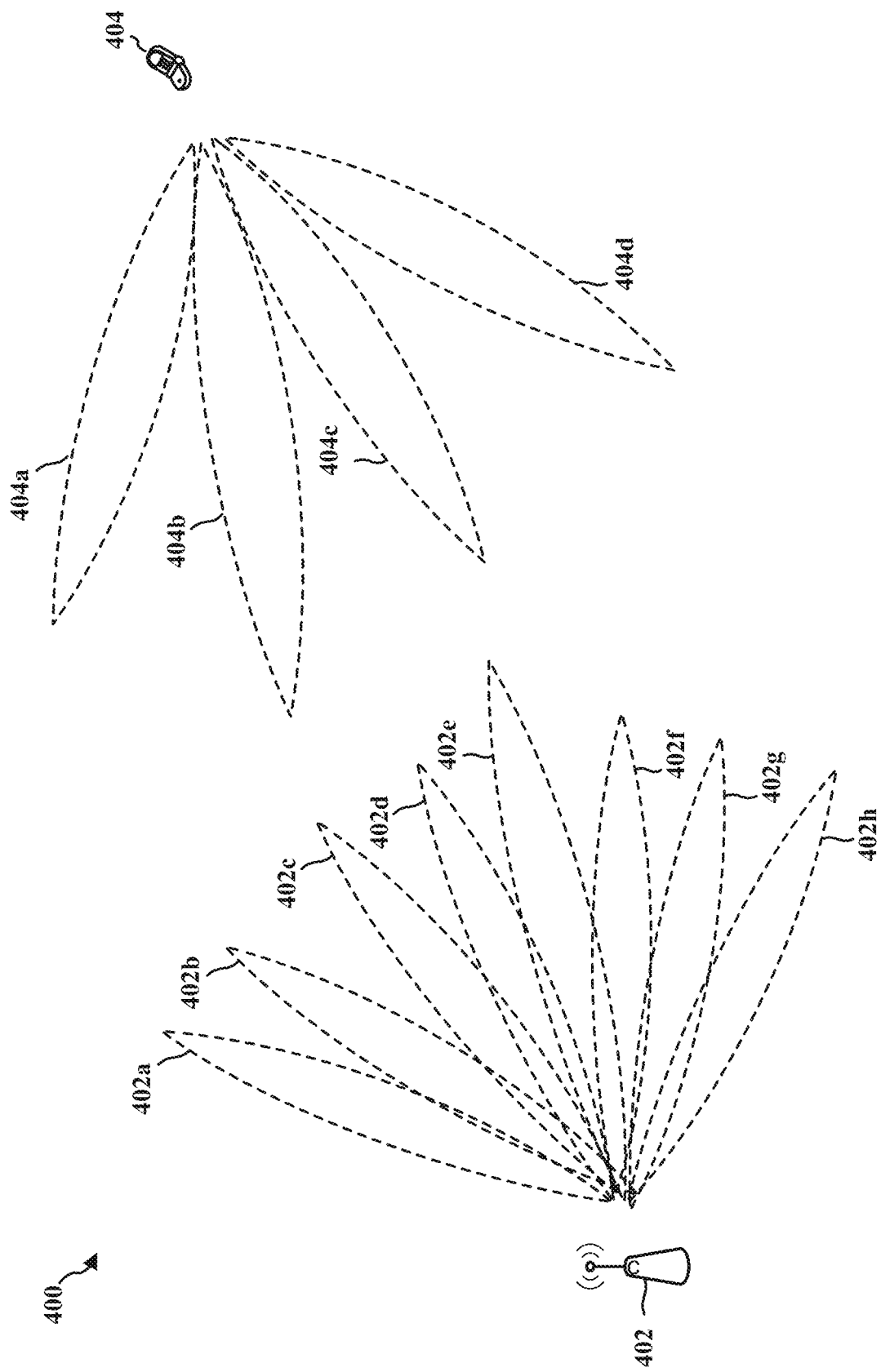

| Index | Sequence q(n) |
|---|---|
| 0 | -3, 3,-3, 3,-3, 3, 1,-1, 1,-1, 1, 3, 1, 3,-3,-1, 1, 3 |
| 1 | -3,-1,-3,-1,-3,-1,-3,-1, 1, 3,-3, 3, 1,-1, 1,-1,-3, 3 |
| 2 | -3, 3,-1,-3,-1,-3, 1, 1,-3,-3,-1,-1, 3,-3, 1, 3, 1, 1 |
| 3 | -3, 1,-1,-1, 3, 1, 1,-3,-1, 1, 3, 3, 1, 3, 1,-1, 1,-1 |
| 4 | -3, 3,-3, 3, 1, 3, 1, 1, 3,-3,-1, 3, 3, 1,-3,-3, 3,-1 |
| 5 | -3,-3, 1,-3, 3, 3, 3,-1, 3, 1, 1,-3,-3,-3, 3,-3,-1,-1 |
| 6 | -3,-3,-1, 1, 1, 1, 1,-3, 1, 1,-3, 1,-3, 1,-3, 3, 3, 1 |
| 7 | -3, 1,-3,-3, 1,-3,-3, 3, 1,-3,-1,-3,-3,-3,-1, 1, 1, 3 |
| 8 | -3,-3,-1,-1,-1, 1,-3, 1,-1, 3,-1,-1, 3,-3,-1,-3, 3, 3 |
| 9 | -3, 3, 1,-1,-1,-1,-1, 1,-1, 3, 3,-3,-1, 1, 3,-1, 3,-1 |
| 10 | -3,-3, 1,-1,-1, 1, 1,-3,-1, 3, 3, 3, 3,-1, 3, 1, 3, 1 |
| 11 | -3,-3, 3, 3,-3, 1, 3,-1,-3, 1,-1,-3, 3,-3,-1,-1,-1, 3 |
| 12 | -3,-3, 3, 3, 3, 1,-3, 1, 3, 3, 1,-3,-3, 3,-1,-3,-1, 1 |
| 13 | -3, 3,-1, 1, 3, 1,-3,-1, 1, 1,-3, 1, 3, 3,-1,-3,-3,-3 |
| 14 | -3, 1,-3,-1,-1, 3, 1,-3,-3,-3,-1,-3,-3, 1, 1, 1,-1,-1 |
| 15 | -3,-3, 3, 3, 3,-1,-1,-3,-1,-1,-1, 3, 1,-3,-3,-1, 3,-1 |
| 16 | -3,-1, 3, 3,-1, 3,-1,-3,-1, 1,-1,-3,-1,-1,-1, 3, 3, 1 |
| 17 | -3,-1,-3,-1,-3, 1, 3,-3,-1, 3, 3, 3, 1,-1,-3, 3,-1, 3 |
| 18 | -3, 3, 1,-1,-1, 3,-3,-1, 1, 1, 1, 1, 1,-1, 3,-1,-3,-1 |
| 19 | -3, 1, 1, 1,-1, 1, 3, 1,-1, 1, 1, 3,-3, 3,-1,-1, 3,-1 |
| 20 | -3,-3,-1,-1,-3,-3, 1,-1, 3, 1, 3, 1,-1,-3,-1, 3,-3, 1 |
| 21 | -3,-3, 3,-1, 3,-3, 1,-3,-3, 3, 3,-3, 1,-3,-3,-1, 1, 1 |
| 22 | -3, 1, 3,-3,-3,-3,-1,-3, 1,-1,-3, 1,-3,-3,-3, 3, 3, 1 |
| 23 | -3,-1,-1,-3, 1,-3, 3,-1,-1,-3, 3, 3,-3,-1, 3,-1,-1,-1 |
| 24 | -3,-3,-3, 1,-3, 3, 1, 1, 3,-3,-3, 1, 3,-1, 3,-3,-3, 3 |
| 25 | -3,-3, 1, 3,-1,-3,-3, 1, 3, 1, 3,-1,-3, 1,-1,-1, 1, 1 |
| 26 | -3,-1, 1, 1,-3,-1, 3,-1,-1,-1,-1, 1,-1,-3, 1,-3, 3, 3 |
| 27 | -3,-3,-3,-1,-3, 1, 1,-1,-3,-1,-3, 3, 3,-3,-1, 3,-3, 1 |
| 28 | -3, 1,-1, 1,-1, 3,-3, 1, 3,-1, 3, 3,-1,-1, 1, 1,-1,-1 |
| 29 | -3, 3, 1, 3, 1,-3, 3, 3, 1, 3, 3,-1, 3,-3,-1,-1, 1, 3 |

| Index | Sequence q(n) |
|---|---|
| 0 | -3,-3,-3, 1, 3, 1, 3, 1, 3,-3,-3,-1,-1,-3, 3, 1, 1,-1,-3, 1, 1, 3, 1,-1, 3,-1, 1, 3,-3, 1 |
| 1 | -3, 1,-1,-3, 3,-1, 3,-3,-1,-3,-3, 1, 3,-3,-3,-1, 1, 3, 3, 1, 1,-1,-3,-1,-3,-1,-3, 1, 1, 1 |
| 2 | -3,-3,-3, 1,-1, 1,-1, 1,-1,-3,-3, 3, 3,-3,-1, 1, 1, 3,-3, 1, 1,-1, 1, 3,-1, 3, 1,-1,-3, 1 |
| 3 | -3, 1, 3,-3,-1, 3,-1,-3, 3,-3,-3, 1,-1,-3,-3, 3, 1,-1,-1, 1, 1, 3,-3, 3,-3, 3,-3, 1, 1, 1 |
| 4 | -3,-3,-3,-3,-3,-3, 1,-1,-1, 3,-3, 3, 1,-3, 1,-1,-3, 3, 3,-1, 1, 3,-3,-1,-1, 1,-3, 1,-3 |
| 5 | -3,-3,-3,-3,-3,-3,-3, 1, 3, 3,-1,-3,-1, 1,-3, 1, 3,-3,-1,-1, 3, 1,-1,-3, 3, 3, 1,-3, 1,-3 |
| 6 | -3,-3,-3,-3,-3, 3, 1,-1,-3,-3,-1, 1,-3, 1,-1, 3, 3, 1,-3, 3,-1, 1, 1,-3,-1,-3,-1, 1,-3 |
| 7 | -3,-3,-3,-3,-3,-1, 1, 3,-3,-3,-3, 3, 1,-3, 1, 3,-1,-1, 1,-3,-1, 3, 1, 1,-3, 3,-3, 3, 1,-3 |
| 8 | -3, 3, 1,-3,-1,-1, 3,-1, 3,-3,-1, 3, 3,-1,-1, 1, 1,-3,-1, 3,-1, 1,-1, 3,-3,-3,-3,-3,-3 |
| 9 | -3,-1, 1,-3, 3, 3,-1, 3,-1,-3, 3,-1,-1, 3, 3, 1, 1,-3, 3,-1, 3, 1, 3,-1,-3,-3,-3,-3,-3 |
| 10 | -3,-3,-3,-3, 3, 1, 1, 3, 1,-1,-3, 3, 3,-1,-1,-1, 3,-1, 1, 1,-1, 3,-1, 1, 1, 3,-1, 3,-1, 1 |
| 11 | -3,-3,-3,-3,-1, 1, 1,-1, 1, 3,-3,-1,-1, 3, 3, 3,-1, 3, 1, 1, 3,-1, 3, 1, 1,-1,-1, 3, 1 |
| 12 | -3, 1, 1,-3,-3, 3, 3,-3,-3,-1,-3,-3,-1, 3,-1, 3,-1, 3,-3, 1,-1,-1, 1,-3,-3,-1,-3, 3, 3, 3 |
| 13 | -3, 1, 1,-3,-3,-1,-1,-3,-3, 3,-3,-3, 3,-1, 3,-1, 3,-1,-3, 1, 3, 3, 1,-3,-3, 3,-3,-1,-1,-1 |
| 14 | -3,-1, 1, 3,-1, 3,-3, 1, 3, 1,-1, 1,-1, 1, 3, 1,-3, 1,-1,-3, 1,-3,-3,-3, 1,-1,-3, 1, 1, 1 |
| 15 | -3, 3, 1,-1, 3,-1,-3, 1,-1, 1, 3, 1, 3, 1,-1, 1,-3, 1,-3, 1,-3,-3,-3, 1, 3,-3, 1, 1, 1 |
| 16 | -3,-3, 3, 1,-1,-3,-3, 1,-3,-1, 1, 1,-3,-1,-1,-1, 3,-1, 3,-3, 1,-3, 3,-1,-3, 1,-3, 3, 3, 3 |
| 17 | -3,-3,-1, 1, 3,-3,-3, 1,-3, 3, 1, 1,-3, 3, 3, 3,-1, 3,-1,-3, 1,-3,-1, 3,-3, 1,-3,-1,-1,-1 |
| 18 | -3,-3,-3, 1, 3,-1,-1,-1,-3,-3,-3,-3,-1,-1, 3, 1,-1, 3,-1, 1, 3,-1, 3, 1,-3,-3,-3, 1,-1 |
| 19 | -3,-3,-3, 1,-1, 3, 3, 3,-3,-3,-3,-3,-3, 3, 3,-1, 1, 3,-1, 3, 1,-1, 3,-1, 1,-3,-3,-3, 1, 3 |
| 20 | -3,-3,-3,-3,-3, 3, 1, 3,-1, 3, 1,-3, 1,-1,-1, 3, 1,-3,-1,-1, 3, 1,-3,-1, 3,-3,-1, 1 |
| 21 | -3,-3,-3,-3,-3,-1, 1,-1, 3,-1, 1,-3,-3, 1, 3, 3,-1, 1,-3, 3, 3,-1,-1, 1,-3, 3,-1,-3, 3, 1 |
| 22 | -3,-3,-3, 1, 3,-3,-1, 1, 1, 3, 3, 3, 1, 3, 1, 1,-1, 1, 3,-1, 1,-3,-3,-1, 3, 1,-1, 3, 1 |
| 23 | -3,-3,-3, 1,-1, 3,-3, 3, 1, 1,-1,-1,-1, 1,-1, 1, 1, 3, 1,-1, 3, 1,-3,-3, 3,-1, 1, 3,-1, 1 |
| 24 | -3,-3,-3, 3,-3, 1, 1, 3,-1,-3,-3,-1, 1, 1,-1,-3,-1, 1, 3,-1, 3,-1, 3, 3, 1,-1,-3, 3,-1,-1 |
| 25 | -3,-3,-3,-1,-3, 1, 1,-1, 3,-3,-3, 3, 1, 1, 3,-3, 3, 1,-1, 3,-1, 3,-1,-1, 1, 3,-3,-1, 3, 3 |
| 26 | -3,-3, 1,-1,-3,-3,-3,-1,-1, 3,-3,-3,-1,-3,-1,-1, 3, 3, 3, 1, 1,-3,-1,-1, 3,-1, 3,-3, 1,-3 |
| 27 | -3,-3, 1, 3,-3,-3,-3, 3, 3,-1,-3,-3, 3,-3, 3, 3,-1,-1,-1, 1, 1,-3, 3, 3,-1, 3,-1,-3, 1,-3 |
| 28 | -3,-3,-3,-3,-1, 1, 3,-3, 3, 1,-1, 3, 1, 1, 3,-1, 3, 1, 3,-3, 3,-1, 3, 1,-1,-1, 1, 3,-3, 3 |
| 29 | -3,-3,-3,-3, 3, 1,-1,-3,-1, 1, 3,-1, 1, 1,-1, 1, 3,-1, 1,-1,-3,-1, 3,-1, 1, 1, 3, 3,-1,-3,-1 |

FIG. 5D

SIGNAL GENERATION USING LOW PEAK-TO-AVERAGE POWER RATIO BASE SEQUENCES

CROSS-REFERENCE TO RELATED APPLICATIONS

This application claims the benefit of U.S. Provisional Application Ser. No. 62/592,313, entitled "REFERENCE SIGNAL HAVING A BASE SEQUENCE SELECTED FROM A TABLE OF BASE SEQUENCES THAT EACH SHARE A PLURALITY OF WAVEFORM CHARACTERISTICS" and filed on Nov. 29, 2017, which is expressly incorporated by reference herein in its entirety.

BACKGROUND

Field

The present disclosure relates generally to communication systems, and more particularly, to techniques for generating a reference signal.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology, including a need for improvements in sequence generation at a User Equipment (UE). These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Transmit signals that use an OFDMA waveform may have high peak values in the time domain since many subcarrier components may be added via an inverse fast Fourier transform (IFFT) operation prior to transmission. As a result, systems communicating using OFDMA waveforms may experience a high peak-to-average power ratio (PAPR) as compared to single-carrier systems. A high PAPR may cause a base station to transmit at a lower power and hence have a reduced coverage area (e.g., reduced link budget). A high PAPR may be particularly detrimental in a communication system that operates using millimeter wave (mmW) frequencies and/or near mmW frequencies, e.g., a 5G NR system, because communications using the mmW/near mmW radio frequency band may experience high path loss and may have a short range. In addition, radio frequency (RF) constraints and the propagation properties (e.g., high path loss and/or a short range) of the mmW frequency band may create certain design challenges for cellular networks.

Compared to an OFDMA waveform, a Discrete Fourier Transform Spreading Orthogonal Frequency Division Multiplexing (DFT-s-OFDM) waveform may have a relatively flexible configuration and may provide a lower PAPR and a lower cubic metric (CM). Using a waveform with a flexible configuration, a lower PAPR, and a lower CM (e.g., as compared to a waveform with a less flexible configuration, a higher PAPR, and a higher CM) may provide benefits in power efficiency and link budget enhancement within a communication system that operates using the mmW frequency band.

Along with a DFT-s-OFDM waveform, a reference signal (e.g., a demodulation reference signal (DMRS)) may be transmitted by a UE to provide channel estimation that may be useful in demodulation and/or frequency-domain equalization of data information and/or control information by the base station. However, certain reference signals (e.g. reference signals for an LTE systems) may suffer from low configuration flexibility, a high PAPR, a high CM, and may experience inter-symbol interference (ISI) that may reduce the link budget and the coverage of the communication system. Thus, there is a need to generate a reference signal using a base sequence with particular wave form characteristics (e.g., a relatively low PAPR as compared to reference signal used for LTE (e.g., 1-2 dB less than the PAPR for LTE reference signals), relatively low cross-correlation between base sequences that may be used to generate reference signals for 5G NR (0.55-0.65), relatively low cross-correlation with reference signal used in LTE (e.g., cross-correlation between LTE reference signals may be 0.66), a relatively low CM as compared to a reference signal used for LTE, resilience against ISI, and a relatively flexible configuration as compared to reference signal used for LTE).

The present disclosure provides a solution by generating a reference signal using a base sequence that is selected from a table of base sequences that each share a plurality of waveform characteristics, e.g., such as a relatively low PAPR as compared to reference signal used for LTE. The base sequences may also share a relatively low cross-correlation between the base sequences in the table, a relatively low cross-correlation with reference signals used in LTE, a relatively low CM as compared to a reference signal used for LTE, resilience against ISI, and/or a relatively flexible configuration as compared to reference signal used for LTE.

In an aspect of the disclosure, a method, a computer-readable medium, and an apparatus are provided. The apparatus may determine a UE. The apparatus may generate a reference signal using a base sequence obtained from a table, the table including a plurality of base sequences that each have a PAPR below a reference threshold. Then, the apparatus may transmit the reference signal to a base station. The reference signal may be multiplexed with a data transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

FIG. 4 is a diagram illustrating a base station in communication with a UE.

FIG. 5C illustrates a base sequence table that include a plurality of base sequences, each with a length of 18 sequence values that may be used to generate a reference signal symbols.

FIG. 5D illustrates a base sequence table that include a plurality of base sequences, each with a length of 30 sequence values that may be used to generate a reference signal symbols.

DETAILED DESCRIPTION

Figure 1:
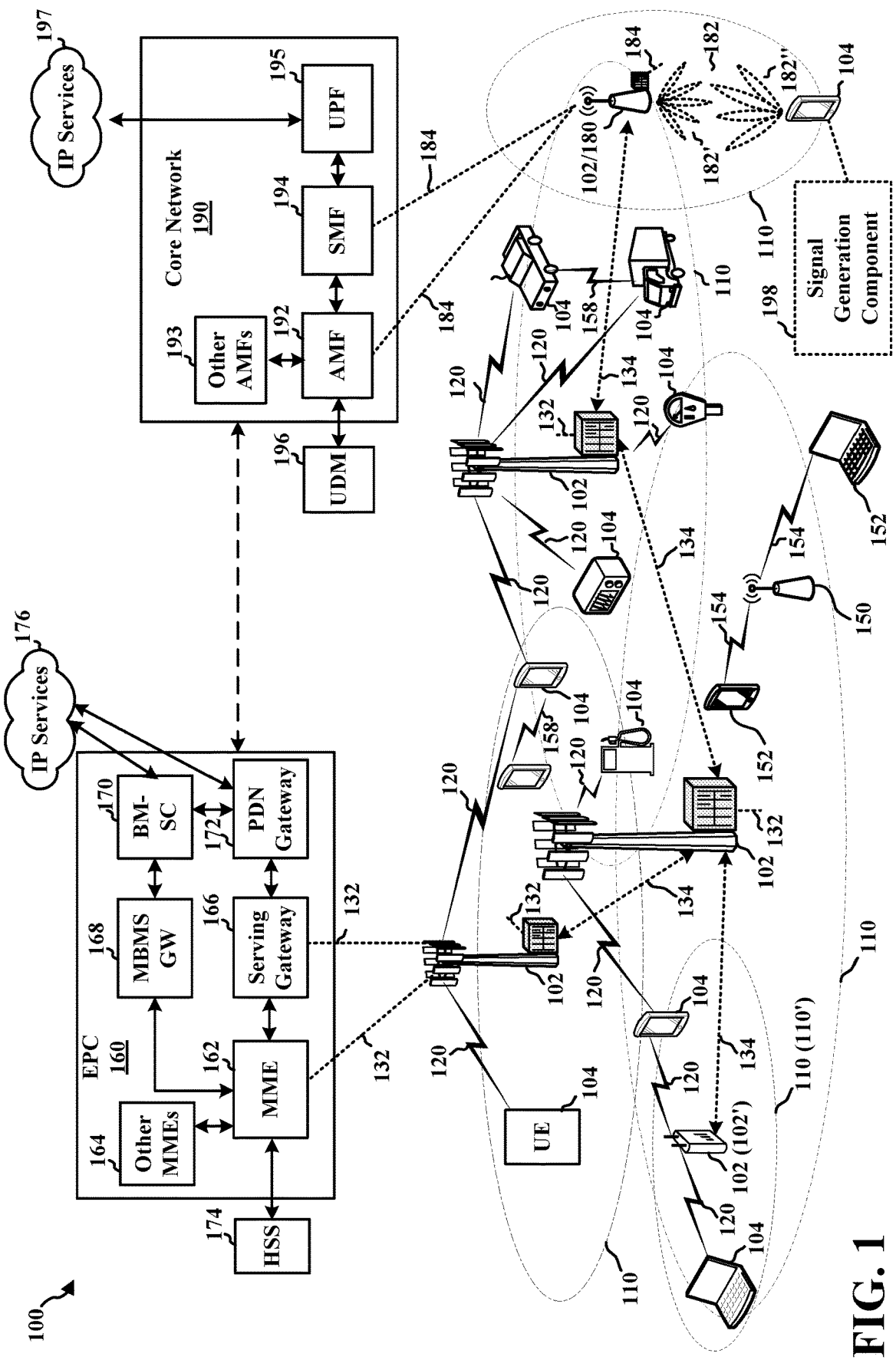
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a second Core network 190, such as a 5G core network. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as next generation radio access network (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the radio frequency (RF) band in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has high path loss and a short range. The mmW base station 180 may utilize beamforming 182 with the UE 104 to compensate for the high path loss and short range.

The base station 180 may transmit a UE-bound beamformed signal to the UE 104 in one or more transmit directions 182'. The UE 104 may receive the UE-bound beamformed signal from the base station 180 in one or more receive directions 182". The UE 104 may also transmit a BS-bound beamformed signal to the base station 180 in one or more transmit directions. The base station 180 may receive the BS-bound beamformed signal from the UE 104 in one or more receive directions. The base station 180/UE 104 may perform beam training to determine the best receive and transmit directions for each of the base station 180/UE 104. The transmit and receive directions determined by beam training for the base station 180 may or may not be the same. The transmit and receive directions determined by beam training for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions.

The PDN Gateway 172 and the BM-SC 170 are connected to the IP Services 176. The IP Services 176 may include the Internet, an intranet, an IP Multimedia Subsystem (IMS), a Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The core network 190 may include a Access and Mobility Management Function (AMF) 192, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a signal generation component 198 configured to generate a reference signal using a base sequence selected from a table of base sequences that each share at least one waveform characteristic including a low peak-to-average-ratio (PAPR) (for example, base sequences where each base sequence has a PAPR below a reference threshold), a low cross-correlation with base sequences of another RAT (for example, base sequences with a cross-correlation with base sequences of another RAT, i.e., inter-RAT cross-correlation, below a reference threshold), a low cross correlation among sequences of the table (for example, base sequences with a cross-correlation with other base sequences of the reference signal, i.e., intra-reference signal cross-correlation, below a reference threshold), etc., as described below in connection with any of FIGS. 2A-11.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G/NR frame structure is illustrated as being TDD, with subframe 4 in FIG. 2A is illustrated as being configured with slot format 28 (with mostly DL), where D is DL, U is UL, and X is flexible for use between DL/UL, and subframe 3 in FIG. 2C is illustrated as being configured with slot format 34 (with mostly UL). While subframes 3, 4 are shown with slot formats 34, 28, respectively, any particular subframe may be configured with any of the various available slot formats, e.g., any of slot formats 0-55, etc. Slot formats 0, 1 are all DL, UL, respectively. Other slot formats 2-55 include a mix of DL, UL, and flexible symbols. As known to those of skill in the art, slot formats (e.g., slot formats each identified by a corresponding format index, for example, 0, 1, 2, etc.) can be provided in various specifications, where each slot format identifies for each symbol number in the slot whether such symbol is a DL symbol, an UL symbol, or a flexible symbol. One example slot format definition is provided in Table 11.1.1.-1 of TS 38.213, V15.2.0. UEs are configured with the slot format (dynamically through DL control information (DCI), or semi-statically/statically through radio resource control (RRC) signaling) through a received slot format indicator (SFI).

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or DFT-s-OFDM symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kKz, where $\mu$ is the numerology 0 to 5. As such, the numerology $\mu=0$ has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference signals (RSs) for the UE (sometimes also referred to a pilot signals). The RSs may include demodulation RS (DM-RS) (indicated as $R_x$ for one particular configuration, where 100x is the port number, but other DM-RS configurations are possible) and channel state information reference signals (CSI-RS) for channel estimation at the UE. The RSs may also include beam measurement RS (BMRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDMA symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data and may additionally be used to carry a buffer status report (BSR), a power headroom report (PHR), and/or UCI.

Figure 3:
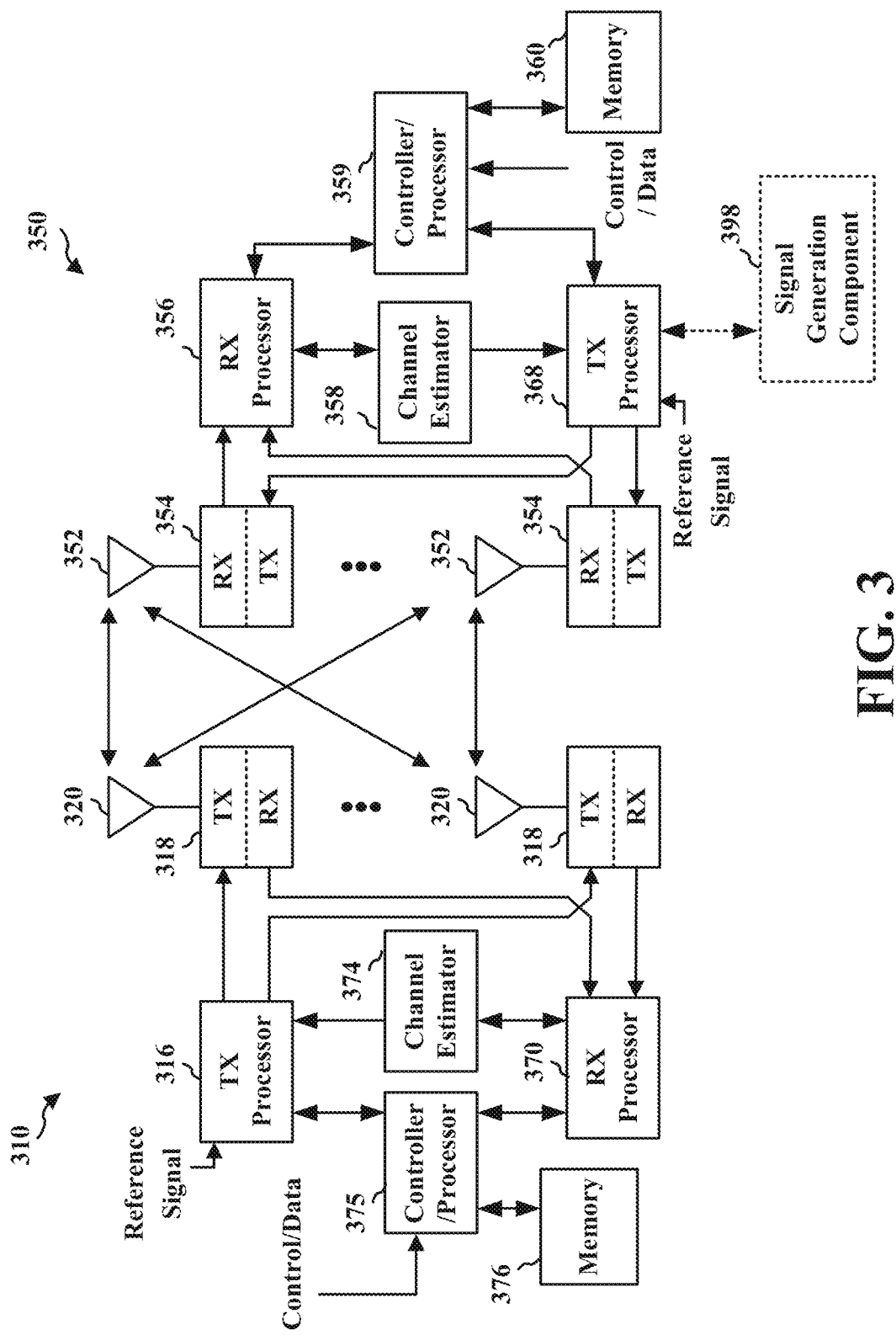
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDMA subcarrier, multiplexed with a reference signal (e.g., pilot) in the time and/or frequency domain, and then combined together using an Inverse Fast Fourier Transform (IFFT) to produce a physical channel carrying a time domain OFDMA symbol stream. The OFDMA stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDMA symbol stream. The RX processor 356 then converts the OFDMA symbol stream from the time-domain to the frequency domain using a Fast Fourier Transform (FFT). The frequency domain signal comprises a separate OFDMA symbol stream for each subcarrier of the OFDMA signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium, for example, a computer-readable medium storing computer executable code of a user equipment (UE) comprising code instructing one or more processors (such as, for example, controller processor 359, TX processor 368, and/or the like), to perform various aspects of methods disclosed herein that would be performed by a UE, for example, methods illustrated with reference to FIGS. 6 and 9. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations. In certain aspects, the UE 350 may include a signal generation component 398 configured to generate a reference signal using a base sequence selected from a table of base sequences that each share at least one waveform characteristic including a low PAPR, a low cross-correlation with base sequences of another RAT, a low cross correlation among sequences of the table, etc., as described below in connection with any of FIGS. 2A-11.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The memory 376 can be an implementation of a computer-readable medium storing computer executable code of a base station, comprising code instructing one or more processors to perform various aspects of methods disclosed herein that would be performed by a base station. Additionally or alternatively, memory 376 can receive and store such instructions from an other non-transitory computer-readable medium containing such instructions. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Transmit signals that use an OFDMA waveform may have high peak values in the time domain since many subcarrier components may be added via an IFFT operation prior to transmission. As a result, systems communicating using OFDMA waveforms may experience a high PAPR as compared to single-carrier systems. A high PAPR may cause a base station or a UE to transmit at a lower power and hence have a reduced coverage area (e.g., reduced link budget). A high PAPR may be particularly detrimental in a 5G NR system that operates using an expanded mmW frequency bandwidth (e.g., as compared to other communication systems that employ the mmW frequency bandwidth) because communications using the mmW frequency band may experience high path loss and a short range. In addition, radio frequency (RF) constraints and the propagation properties (e.g., high path loss and/or a short range) of the mmW frequency band may create certain design challenges for cellular networks.

Compared to a OFDMA waveform, a DFT-s-OFDM waveform may have a relatively flexible configuration and provide a lower PAPR and a lower cubic metric (CM). Using a waveform with a flexible configuration, a lower PAPR, and a lower CM (e.g., as compared to a waveform with a less flexible configuration, a higher PAPR, and a higher CM) may provide benefits in power efficiency and link budget enhancement within a communication system that operates using the mmW frequency band.

Along with a DFT-s-OFDM waveform, a reference signal (e.g., a DMRS) may be transmitted to provide channel estimation that may be useful in demodulation and/or frequency-domain equalization of data information and/or control information by the base station. However, certain reference signals (e.g. reference signal for LTE systems) may suffer from low configuration flexibility, a high PAPR, a high CM, and may experience inter-symbol interference (ISI) that may reduce the link budget and the coverage of the communication system. Thus, there is a need to generate a reference signal using base sequence(s) with particular waveform characteristic(s). For example, a table of base sequences may be used by the UE to generate a signal, e.g., a reference signal. The table may comprise base sequences each having a relatively low PAPR, e.g., a PAPR below a reference threshold. The PAPR for each base sequence in the table used for reference signal generation for a given RAT associated with the table may be lower than, for example, the PAPR of any sequence used for reference signal generation for a different RAT from the given RAT. For example, the table may comprise sequences that each have a lower PAPR than, for example, the PAPR of any sequence used for LTE reference signal generation. As one example, the PAPR of any base sequence in the table may be within a range or be less than a threshold, wherein the range or threshold is 1-2 dB less than the range or threshold of PAPR for sequences for LTE reference signals. Additionally or alternatively, a sequence set PAPR metric for the set of sequences in the table, or any subset of sequences in the table, may be lower than a sequence set PAPR metric for a different RAT, e.g., for LTE. Hence, in one example, the sequence set PAPR metric for the set of sequences in the table, or for all base sequences in a subset of sequences selected from the table, may be below a threshold or within a range, as described above. The sequence set PAPR metric may be based on a mean PAPR, a maximum PAPR, and/or a minimum PAPR for the set of sequences in the table or a subset of sequences selected from the table. For example, a maximum PAPR for the sequences in a table (or a subset of sequences selected from the table) where each sequence has a sequence length of 18 may be no more than 2.85 dB, whereas a table of sequences for LTE may have a maximum PAPR of 4.77 dB. The mean PAPR for the sequences in the table (or a subset of sequences selected from the table) may be approximately 2.68 dB, whereas LTE sequences may have a mean PAPR of approximately 3.81 dB. Even a minimum PAPR for the sequences comprised in the table (or a subset of sequences selected from the table) may be lower, e.g., 2.40 dB, than a minimum PAPR of sequences in a table of sequences for LTE, e.g., which may be 3.28 dB. A similar lower PAPR may be provided for tables with sequences of different lengths than 18, e.g., for a table of sequences where each sequence has a length of 6, for a table of sequences where each sequence has a length of 24, or for other lengths of sequences. It is understood that the values listed above are merely illustrative examples. As another example, the base sequences in the table may each have a relatively low cross-correlation with the other sequences comprised in the table. For example, the sequences may have a cross correlation with each other that is no more than 0.65. The cross-correlation between a pair of base sequences may be computed by considering all time-domain cyclic shifts of one sequence relative to the other sequence. As another example, the sequences may have a relatively low cross-correlation with sequences for reference signal used in another radio access technology (RAT). The other RAT may be LTE, and the table may be for use in 5G NR-based communication. As such, when a network that has LTE and 5G NR operating on the same frequency band, the interference causing from LTE-based communication to 5G NR-based communication, and the interference causing from 5G NR-based communication to LTE-based communication is limited. For example, the cross-correlation for a pairing of each of the plurality of base sequences in the table with each base sequence of a set of base sequences associated with LTE may be of similar level as the cross correlation between each combination of the sequences within the table. Thus, a UE that uses the sequences in the table for 5G NR-based communication may experience the same level of interference caused by other 5G NR-based communications as the interference caused by LTE-based communications. As another example, the base sequences in the table may have a relatively low CM as compared to a reference signal used for LTE, e.g., lower than the CM for LTE. As another example, the base sequences in the table may share a resilience against ISI. As another example, the base sequences in the table may share a relatively flexible configuration, e.g., as compared to reference signal using LTE.

Thus, solution presented herein includes generating a reference signal using a base sequence that is selected from a table of base sequences that each share a plurality of waveform characteristics, e.g., such as a relatively low PAPR as compared to reference signal used for LTE, relatively low cross-correlation between base sequences in the table, relatively low cross-correlation with reference signal used in LTE, a relatively low CM as compared to a reference signal used for LTE, resilience against ISI, and/or a relatively flexible configuration as compared to reference signal used for LTE.

Figure 5A:
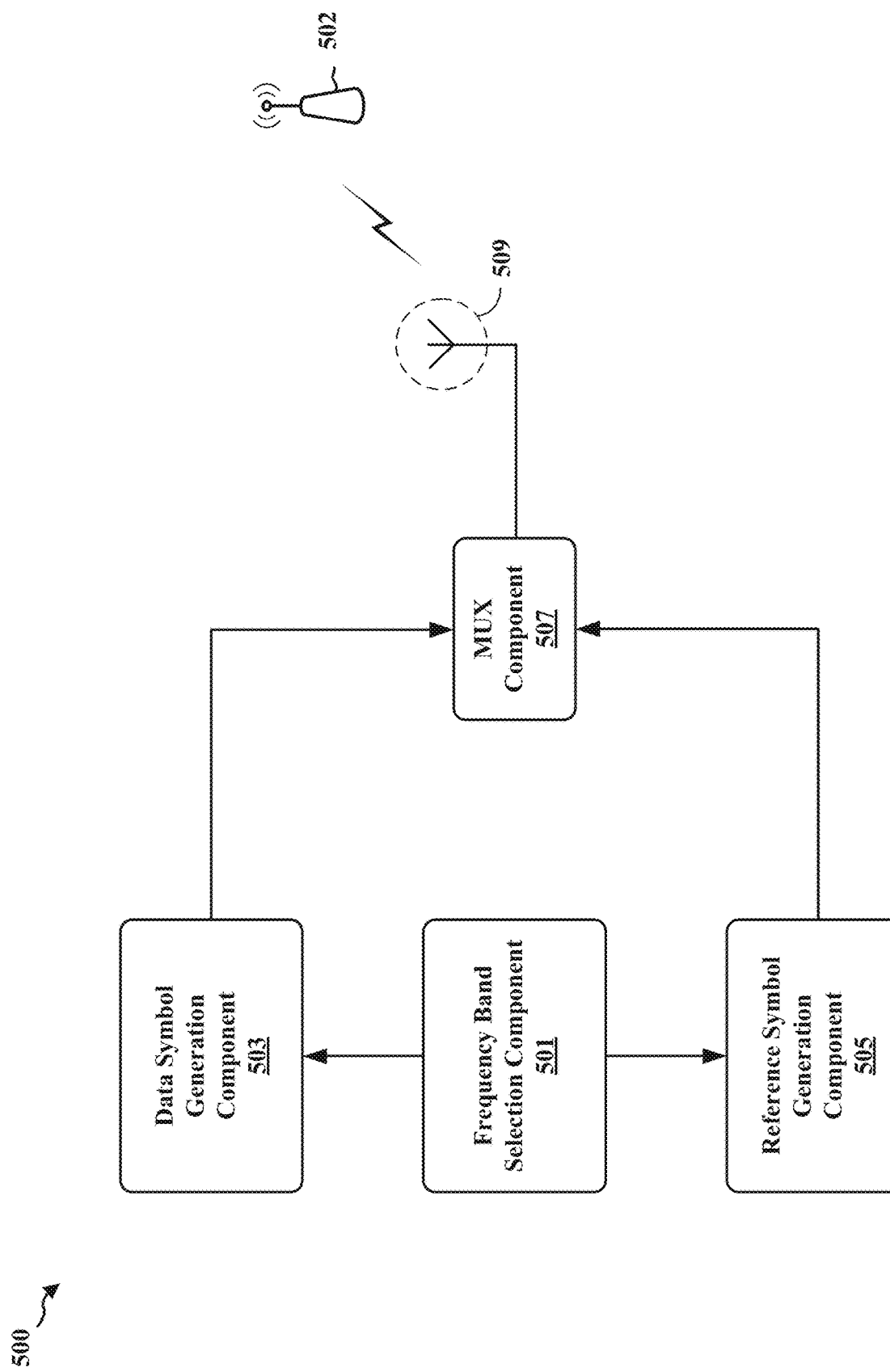
FIG. 5A is a diagram illustrating a UE that may separately generate reference signal symbols and data symbols that are transmitted in a subframe to a base station.

FIG. 5A is a diagram illustrating example components comprised in a UE 500 that may separately generate reference signal symbols and data symbols (e.g., generated as a DFT-s-OFDM waveform) for transmission in a subframe to a base station 502. The UE 500 may include a frequency band selection component 501, a data symbol generation component 503, a reference signal symbol generation component 505, a multiplexer (MUX) component 507, and/or a transmitter 509, e.g., antenna(s). The components may be components comprised in UE 350 illustrated in FIG. 3.

In certain configurations, the frequency band selection component 501 at the UE 500 may be configured to determine a mmW bandwidth for communication with the second device. The frequency band selection component 501 may send a signal associated with the determined mmW bandwidth to one or more of a data symbol generation component 503, the reference signal symbol generation component 505, and/or a MUX component 507.

The data symbol generation component 503 may be configured to generate and/or determine data symbols that have a DFT-s-OFDM waveform. The data symbol generation component 503 may be configured to send a signal associated with the data symbols that have a DFT-s-OFDM waveform to the MUX component 507.

The reference signal symbol generation component 505 may be configured to generate and/or determine reference signal symbols with particular waveform characteristics, including low PAPR and/or low cross-correlation, to transmit with the data symbols. Additional details associated with generating and/or determining reference signal symbols at the reference signal symbol generation component 505 are discussed below in connection with FIG. 5B. The reference signal symbol generation component 505 may be configured to send a signal associated with the reference symbols to the MUX component 507.

The MUX component 507 may be configured to multiplex and/or combine the reference signal symbols and the data symbols for transmission in a subframe by the transmitter 509. The transmitter 509 may be configured to transmit the multiplexed reference symbols and the data symbols to a base station 502.

Figure 5B:
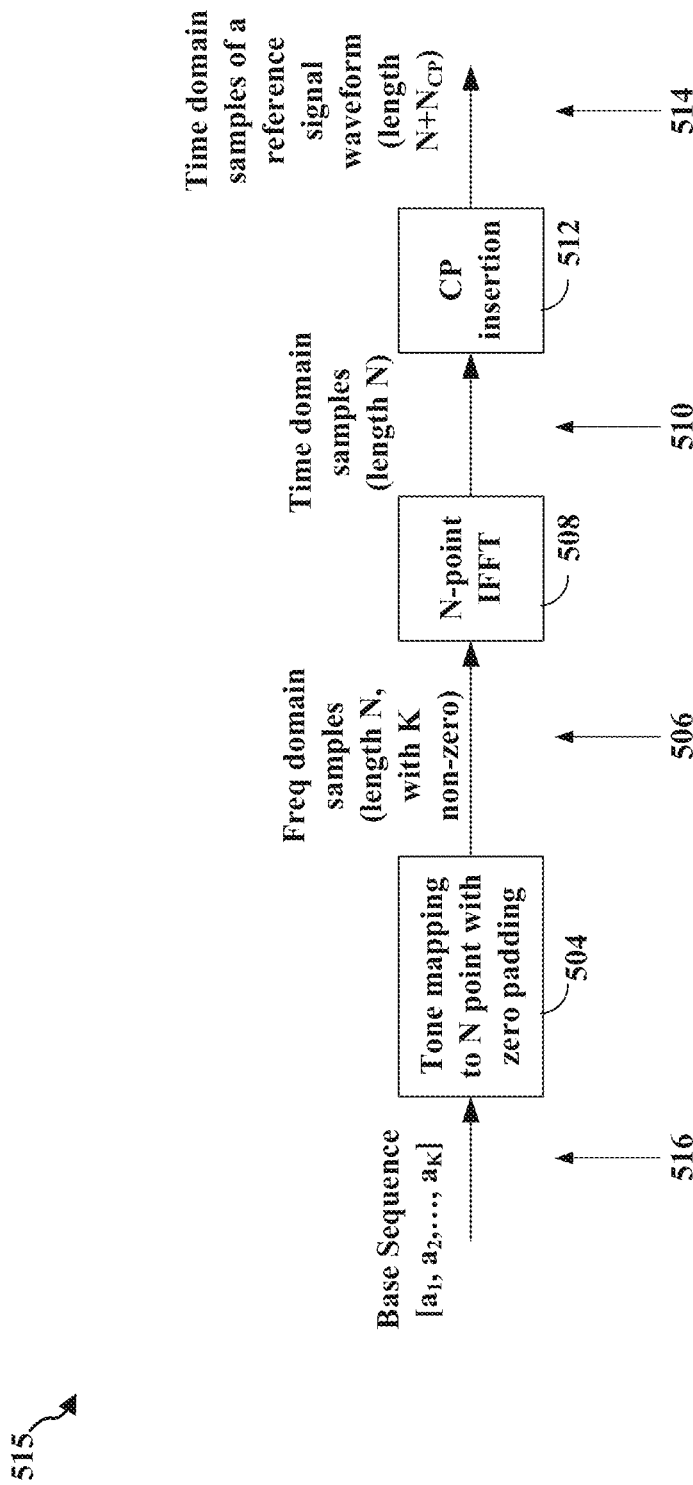
FIG. 5B illustrates example operations for generating reference signal symbols for transmission by a UE.

FIG. 5B illustrates example operations 515 for generating reference signal symbols 514 (e.g., a waveform) for transmission by a UE. The operations 515 may be performed by one or more of the controller/processor 375, controller/processor 359, TX processor 316, transmit processor 368, transmitter 318TX, transmitter 354TX described in connection with UE 350 illustrated in FIG. 3, and/or the reference signal generation component 505 shown in FIG. 5A.

Operations 515 may begin by obtaining a base sequence 516 with a sequence of length K $[a_0, a_1, \ldots a_K]$ representing reference signal symbols to be transmitted. As an example, K=18 for a length 18 sequence. The base sequence 516 may be obtained from a data source (e.g., a look-up table) at the reference signal symbol generation component 505, from the controller/processor 375, or from a signal received from the eNB 310. The base sequence 516 may be obtained/selected from and/or associated with a table of base sequences that share a set of waveform characteristics, e.g., one or more of PAPRs that are within a PAPR threshold range (that is to say that, for example, the base sequences all have a PAPR that is below a threshold or within a threshold range and that none of the base sequences have a PAPR that is outside of the threshold range), a first cross-correlation value for a pairing of each of the plurality of base sequences in the table and each base sequence of a set of base sequences associated with a different RAT (e.g., LTE) is within a first cross-correlation range, and/or a second cross-correlation value for each pairing of base sequences in the table is within a second cross-correlation range. As well, a sequence set PAPR metric for the set of sequences in the table (or a subset of sequences selected from the table) may be lower than a sequence set PAPR metric for a different RAT, e.g., for LTE. The sequence set PAPR metric may be based on a mean PAPR, a maximum PAPR, and/or a minimum PAPR of the set of sequences. The base sequence 516 may include a QPSK computer-generated sequence (CGS) of length K=18 (e.g., as described in connection with the table illustrated in FIG. 5C) or of length K=30 (e.g., as described in connection with the table illustrated in FIG. 5D), or K may be a different length such as 6 or 24, to list a few examples.

The base sequence 516 may be combined with N-K zeroes (e.g., zero padding) and mapped at 504 to N tones to generate N frequency domain samples 506. The mapping to the N tones may be performed by the TX processor 316. In the N-point tone mapping 504, N may equal 2048, for example, which may correspond to an inverse fast Fourier transform (IFFT) size.

The N frequency domain samples may be processed through an N-point IFFT at 508 to generate N time domain samples 510. The processing of the N frequency domain samples through the IFFT at 508 may be performed by the TX processor 316.

A cyclic prefix (CP) insertion may be applied to the N time domain samples at 512. For example, a CP of length $N_{CP}$ may be formed by copying $N_{CP}$ time domain samples from the end of the N time domain samples and inserting those $N_{CP}$ time domain samples at the beginning of the N time domain samples to generate N+$N_{CP}$ time domain samples of a reference signal waveform 514. The N+$N_{CP}$ time domain samples of a reference signal waveform may then be transmitted (e.g., as a reference signal symbols) to a base station.

FIG. 5C illustrates a table 530 comprising examples of potential base sequence. Table 530 includes a plurality of example quaternary CSG sequences, each with a length of 18 sequence values (e.g., 18 values in $\{1, -1, 3, -3\}$) that may be used to generate a reference signal waveform as described above in connection with FIG. 5B. The quaternary sequence may be used to generate a QPSK sequence using equation (1) seen below. Each of the example sequences in the table 530 share a low PAPR, e.g., lower than a PAPR for LTE, share a low cross-correlation with each other, e.g., no more than 0.65, and have a low cross-correlation with sequences of another RAT, e.g., at least LTE. While the table illustrates 29 examples of possible sequences that share these waveform characteristics, a table used by a UE may comprise a different number of sequences. The table may include a subset of the example sequences illustrated in FIG. 5C. Additional sequences that share the waveform characteristic(s) may also be used in the table. The specific sequences illustrated in FIG. 5C are merely illustrative of the principles presented herein.

FIG. 5D illustrates an example base sequence table 545 that include a plurality of quaternary CSG sequences, each sequence with an exemplary length of 30 sequence values. The sequences in table 545 also share a low PAPR, e.g., lower than a PAPR for LTE, share a low cross-correlation with each other, e.g., no more than 0.65, and have a low cross-correlation with sequences of another RAT, e.g., at least LTE. Thus, a UE may select a sequence from table 545 for use in generating a reference signal to send to a base station, as described above in connection with FIG. 5B. Similar to table 530, the specific sequences illustrated in FIG. 5D are merely illustrative of the principles presented herein. A table of length 30 sequences may comprise a subset of the example sequences and/or may include additional sequences that share the waveform characteristic(s). The quaternary sequence may be used to generate a QPSK sequence using equation (1) seen below, where q(n) is the n-th sequence value, and where $j=\sqrt{-1}$.

$$x(n) = e^{\left(\frac{j\pi q(n)}{4}\right)} \quad \text{equation (1)}$$

Figure 6:
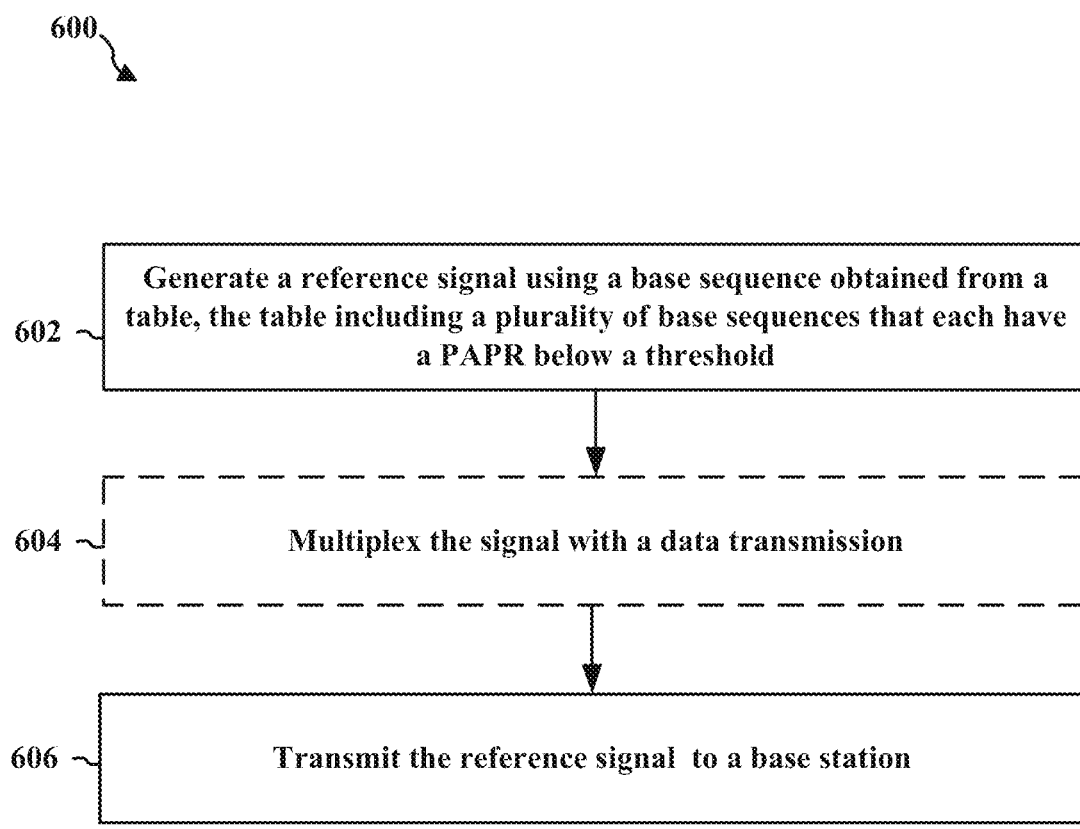
FIG. 6 is a flowchart of a method of wireless communication.

FIG. 6 is a flowchart 600 of a method of wireless communication. The method may be performed by a UE (e.g., the UE 104, 350, 500, the apparatus 702/702'). Optional aspects are illustrated with a dashed line. The method may enable a UE to generate a reference signal in a manner that addresses the unique needs of communication systems that may involve high path loss and short ranges, e.g., of mmW based communication. The method may provide a flexible configuration for reference signals having a lower PAPR, cross-correlation, and/or CM. The method 600 may provide benefits in power efficiency and link budget enhancement within a communication system that operate using a mmW frequency band At 602, the UE may generate a reference signal using a base sequence using a base sequence obtained from a table, the table including a plurality of base sequences that each have a peak-to-average-power ratio (PAPR) below a threshold or within a range. In certain aspects, the table may include any of the base sequences that are illustrated in the example tables of FIGS. 5C and 5D.

Each of the plurality of base sequences comprised in the table may be associated with a first RAT and a first sequence set PAPR metric for the set of sequences may be lower than a second sequence set PAPR metric associated with a second set of sequences for a different RAT. The metric may be based on a minimum PAPR for the set of sequences, a maximum PAPR for the set of sequences, and/or a mean PAPR for the set of sequences. For example, a mean PAPR of the CGSs may be lower than a corresponding mean PAPR value for LTE CGSs of the same length. As another example, a maximum PAPR of the CGSs may be lower than a corresponding maximum PAPR value for LTE CGSs of the same length. As another example, a minimum PAPR of the CGSs may be lower than a corresponding minimum PAPR value for LTE CGSs of the same length. As another example, a maximum PAPR of the CGSs may be smaller than a minimum PAPR of the LTE CGSs of the same length. Thus, the individual sequences in the table may have a PAPR below a threshold and/or the set of sequences may collectively have a minimum/maximum/mean PAPR associated with the set of sequences that is lower than a minimum/maximum/mean PAPR associated with a set of sequences used for another RAT, e.g., LTE. The different RAT may comprise LTE, and the first RAT may comprise NR, e.g. 5G NR. Thus, the table may have sequences sharing a PAPR below that for corresponding sequences used for reference signal generation in LTE, e.g., 1-2 dB less than the PAPR for LTE. The table may comprise base sequences having a sequence length of 18, as illustrated in FIG. 5C. The table may comprise base sequences having a sequence length of 30, as illustrated in FIG. 5D. In other examples, the table may comprise base sequences of a different length, for example, sequences having a length of 6 or 24. The table may comprise at least one pair of sequences comprising a first base sequence along with a symbol-wise reverse of the first base sequence, a symbol-wise conjugate of the first base sequence, and/or a symbol-wise conjugate and reverse of the first base sequence. The plurality of base sequences may represent a set of base sequences including time-cyclic-shifted versions and/or constant-phase-shifted versions of at least one base sequence in the table.

In certain aspects, the base sequences including all possible base sequence permutations of a first length and the second group of base sequences including all possible base sequence permutations of a second length. For example, for length-18, all length-18 QPSK sequences that agree in the first symbol may be generated.

Each of the plurality of base sequences comprised in the table may be associated with a first radio access technology (RAT), and a first cross-correlation value for a first pairing of each of the plurality of base sequences in the table and each base sequence of a set of base sequences associated with a different RAT, e.g., LTE, is no more than a first cross-correlation threshold, e.g., an inter-RAT cross-correlation reference threshold. Each pairing of base sequences within the plurality of base sequences in the table may have a second cross-correlation value with each other below a second cross-correlation threshold. The second cross-correlation threshold may be, e.g., with a range of 0.55-0.65, whereas LTE sequences may share an intra-RAT cross-correlation of approximately 0.66.

In one example, the plurality of base sequences comprised in the table include at least the following sequences, or a subset of the following sequences.

---

−3, 3, −1, −3, −1, −3, 1, 1, −3, −3, −1, −1, 3, −3, 1, 3, 1, 1;
−3, −3, 1, −3, 3, 3, 3, −1, 3, 1, 1, −3, −3, −3, 3, −3, −1, −1;
−3, 1, −3, −3, 1, −3, −3, 3, 1, −3, −1, −3, −3, −3, −1, 1, 1, 3;
−3, 3, 1, −1, −1, −1, −1, 1, −1, 3, 3, −3, −1, 1, 3, −1, 3, −1;
−3, −3, 1, −1, −1, 1, 1, −3, −1, 3, 3, 3, 3, −1, 3, 1, 3, 1;
−3, −3, 3, 3, −3, 1, 3, −1, −3, 1, −1, −3, 3, −3, −1, −1, −1, 3;
−3, −3, 3, 3, 3, 1, −3, 1, 3, 3, 1, −3, −3, 3, −1, −3, −1, 1;
−3, 3, −1, 1, 3, 1, −3, −1, 1, 1, −3, 1, 3, 3, −1, −3, −3, −3;
−3, 1, −3, −1, −1, 3, 1, −3, −3, −3, −1, −3, −3, 3, 1, 1, −1, −1;
−3, −3, 3, 3, 3, −1, −1, −3, −1, −1, −1, 3, 1, −3, −3, −1, 3, −1;
−3, −1, 3, 3, −1, 3, −1, −3, −1, 1, −1, −3, −1, −1, −1, 3, 3, 1;
−3, −1, −3, −1, −3, 1, 3, −3, −1, 3, 3, 3, 1, −1, −3, 3, −1, −3;
−3, 3, 1, −1, −1, 3, −3, −1, 1, 1, 1, 1, 1, −1, 3, −1, −3, −1;
−3, −1, −1, −3, 1, −3, 3, −1, −1, −3, 3, 3, −3, −1, 3, −1, −1, −1; and
−3, −3, −3, 1, −3, 3, 1, 1, 3, −3, −3, 1, 3, −1, 3, −3, −3, 3.

---

These sequences merely provide an example subset of sequences from the sequences in FIG. 5C. Additional sequences beyond those illustrated above and/or in FIG. 5C may also be comprised in the table.

At 606, the UE may transmit the reference signal to a base station. The UE may multiplex the reference signal with an uplink transmission, as illustrated at 604, wherein the reference signal is transmitted with the uplink transmission. For example, referring to FIG. 5A, the MUX component 507 may be configured to multiplex and/or combine the reference symbols and the data symbols for transmission in a subframe by the transmitter 509. The transmitter 509 may be configured to transmit the multiplexed reference symbols and the data symbols to a base station 502.

In certain configurations, the plurality of base sequences included in the table may have been generated by selecting, from the first subset of base sequences, a second subset of base sequences that each have a PAPR value that is within the PAPR threshold range. For example, for length-18 base sequences, collect a set of S sequences (e.g., second subset of sequences) with PAPR smaller than a threshold from the first subset of sequences (base sequences that differ by constant phase rotation are considered as identical sequences).

In certain other configurations, the plurality of base sequences included in the table may have been generated by generating a first subset of base sequences from a second group of base sequences (e.g., length-30 QPSK-based CGSs). For length-30, for example, an exhaustive search of all permutations of base sequence with length-30 may not be feasible, and random sampling is used to generate the first subset of base sequences from the second group of base sequences.

In certain other configurations, when the first subset of base sequences were generated from the second group of base sequences, the second subset of base sequences (e.g., the set of S sequences) that each have the PAPR value that is within the PAPR threshold range may be selected from the first subset of base sequences by determining a first base sequence in the first subset of base sequences has the PAPR value that is within the PAPR threshold range.

When random sampling is used, the number of base sequences selected for the second subset of base sequences may be increased to the size of S (e.g., by a factor of 4*30) by grouping the first base sequence, a symbol-wise reverse of the first base sequence, a symbol-wise conjugate of the first base sequence, and a symbol-wise conjugate and reverse of the first base sequence in the second subset of base sequences. For example, if a sequence $[a_1, a_2, \ldots, a_{30}]$ has PAPR smaller than the threshold or within a PAPR range, then the base sequence's symbol-wise reverse $[a_{30}, a_{29}, \ldots, a_1]$, the base sequence's symbol-wise conjugate

[$a_1^*, a_2^*, \ldots, a_{30}^*$], and the base sequence's symbol-wise conjugated and reversed sequence [$a_{30}^*, a_{29}^*, \ldots, a_1^*$] will have all the same PAPR as the original base sequence and can all be included in the second set of base sequences (e.g., set S).

In certain other aspects, the number of base sequences selected for the second subset of base sequences may be increased to the size of S (e.g., by a factor of 4*30) by grouping all cyclically-shifted versions of the first base sequence, all cyclically-shifted versions of the symbol-wise reverse of the first base sequence, all cyclically-shifted versions of the symbol-wise conjugate of the first base sequence, and all cyclically-shifted versions of the symbol-wise conjugate and reverse of the first base sequence in the second subset of base sequences. For example, all cyclically-shifted versions of [$a_1, a_2, \ldots, a_{30}$], [$a_{30}, a_{29}, \ldots, a_1$], [$a_1^*, a_2^*, \ldots, a_{30}^*$], and [$a_{30}^*, a_{29}^*, \ldots, a_1^*$] (shifted in the frequency domain) may also have the same PAPR, and may also be included in the candidate set S.

In certain other configurations, the plurality of base sequences included in the table may have been further generated by determining a first cross-correlation value for a first pairing between each base sequence in the second subset of base sequences and each base sequence in the set of base sequences associated with the different RAT. For example, the maximum cross-correlation between each sequence in set S with all 30 sequences used in LTE of the same length may be determined.

In certain aspects, the first cross-correlation value may be determined as a first maximum cross-correlation value for each up-sampled and cyclically time-shifted versions of a base sequence pairing. For example, the maximum cross-correlation between a pair of sequences [$a_1, \ldots, a_{30}$] and [$b_1, \ldots, b_{30}$] may be calculated as the maximum of correlations between [$a_1, \ldots, a_{30}$] and all K*30 up-sampled and time-cyclic-shifted versions of [$b_1, \ldots, b_{30}$], where K is an integer denoting the up-sampling factor.

In certain other configurations, the plurality of base sequences included in the table were further generated by selecting, from the second subset of base sequences, a third subset of base sequences that each have a determined first cross correlation value that is within the first cross-correlation range. For example, base sequences whose maximum cross correlation with LTE CGSs exceeds a threshold value or is outside of a cross-correlation threshold range may be removed from the candidate set S.

In certain other configurations, the plurality of base sequences included in the table may have been further generated by determining a second cross-correlation value for each base sequence pair in the third subset of base sequences. In certain aspects, the maximum cross-correlation between each pair of sequences remaining in the candidate set S may be determined.

In certain aspects, the second cross-correlation value may be determined as a second maximum cross-correlation value for each up-sampled and cyclically time-shifted version of a base sequence pairing. For example, the maximum cross-correlation between a pair of sequences [$a_1, \ldots, a_{30}$] and [$b_1, \ldots, b_{30}$] may be calculated as the maximum of correlations between [$a_1, \ldots, a_{30}$] and all K*30 up-sampled and time-cyclic-shifted versions of [$b_1, \ldots, b_{30}$], where K is an integer denoting the up-sampling factor.

In certain other configurations, the plurality of base sequences included in the table may have been further generated by selecting, from the third subset of base sequences, a fourth subset of base sequences that each have a determined second cross correlation value that is within the second cross-correlation range. For example, if the maximum cross-correlation between a pair of sequences is higher than a threshold or outside of a threshold range, then the sequence with the higher PAPR may be removed from the set S.

In certain other configurations, the plurality of base sequences included in the table may have been further generated by adjusting one or more of the PAPR range, the first cross-correlation range, or the second cross-correlation range until the fourth subset of base sequences is reduced to a predetermined number N (e.g., N>30). For example, the PAPR thresholds/threshold ranges and the different cross-correlation thresholds/threshold ranges used in previous steps may be adjusted, and the previous steps may be repeated so that the number of CGS base sequences in the table is greater than N (e.g., 100, 50, 29, 20, etc.). Then, M number of CGSs from the set of N CGSs that minimize the maximum cross correlation may be selected for the table (e.g., the base sequences listed in the tables illustrated in FIGS. 5C and 5D).

Figure 7:
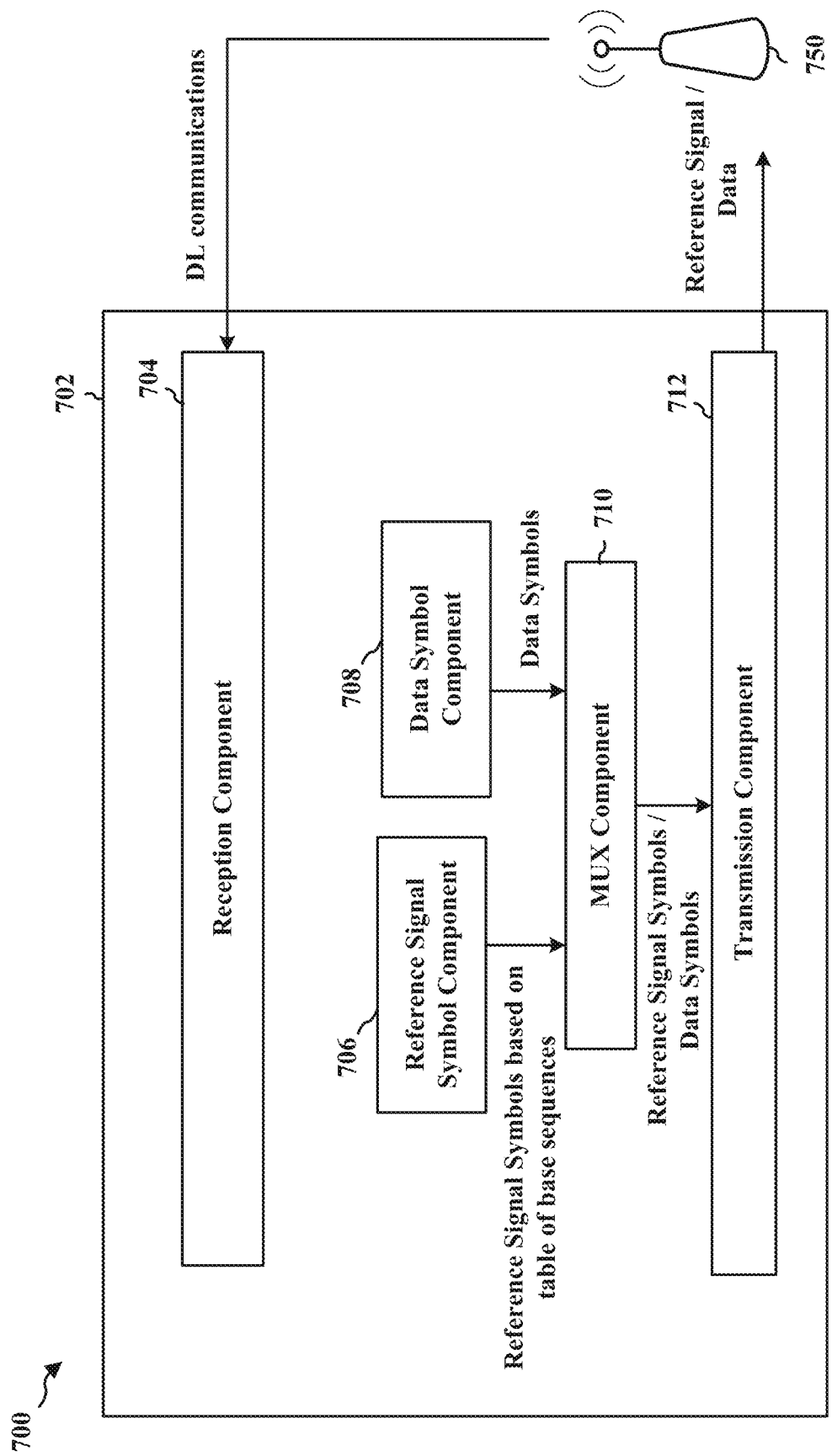
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a UE (e.g., UE 104, 350, 500, the apparatus 702') in communication with a base station 750 (e.g., base station 102, 180, 310, 502). The apparatus may include a reception component 704 configured to receive downlink communication from the base station 750 and a transmission component 712 configured to transmit uplink communication to the base station 750. As described herein, the apparatus may further include a reference signal symbol component 706, a data symbol component 708, and/or an MUX component 710.

In certain aspects, the reference signal symbol component 706 may be configured to generate a reference signal using a base sequence obtained from a table, the table including a plurality of base sequences that each have a PAPR below a threshold and/or within a range, e.g., as described in connection with 602 in FIG. 6. As well, a sequence set PAPR metric for the set of sequences in the table may be lower than a sequence set PAPR metric for another RAT. In certain aspects, the table may include a plurality of base sequences that share additional waveform characteristics. The reference signal symbol component 706 may be configured to send the generated reference signal symbols to the MUX component 710. The data symbol component 708 may be configured to generate data symbols for a UL transmission to the base station 750. The data symbol component 708 may be configured to send the data symbols to the MUX component 710. The MUX component 710 may be configured to multiplex the data symbols and the reference signal symbols, e.g., in preparation for transmission via transmission component 712, e.g., as described in connection with 604 in FIG. 6. The MUX component 710 may be configured to send the multiplex data symbols and reference signal symbols to the transmission component 712.

The transmission component 712 may be configured to transmit the reference signal, whether or not multiplexed with the uplink data symbols, to the base station 750, e.g., as described in connection with 606 in FIG. 6.

In certain other configurations, the reception component 704 may be configured to receive one or more DL transmissions from the base station 750.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
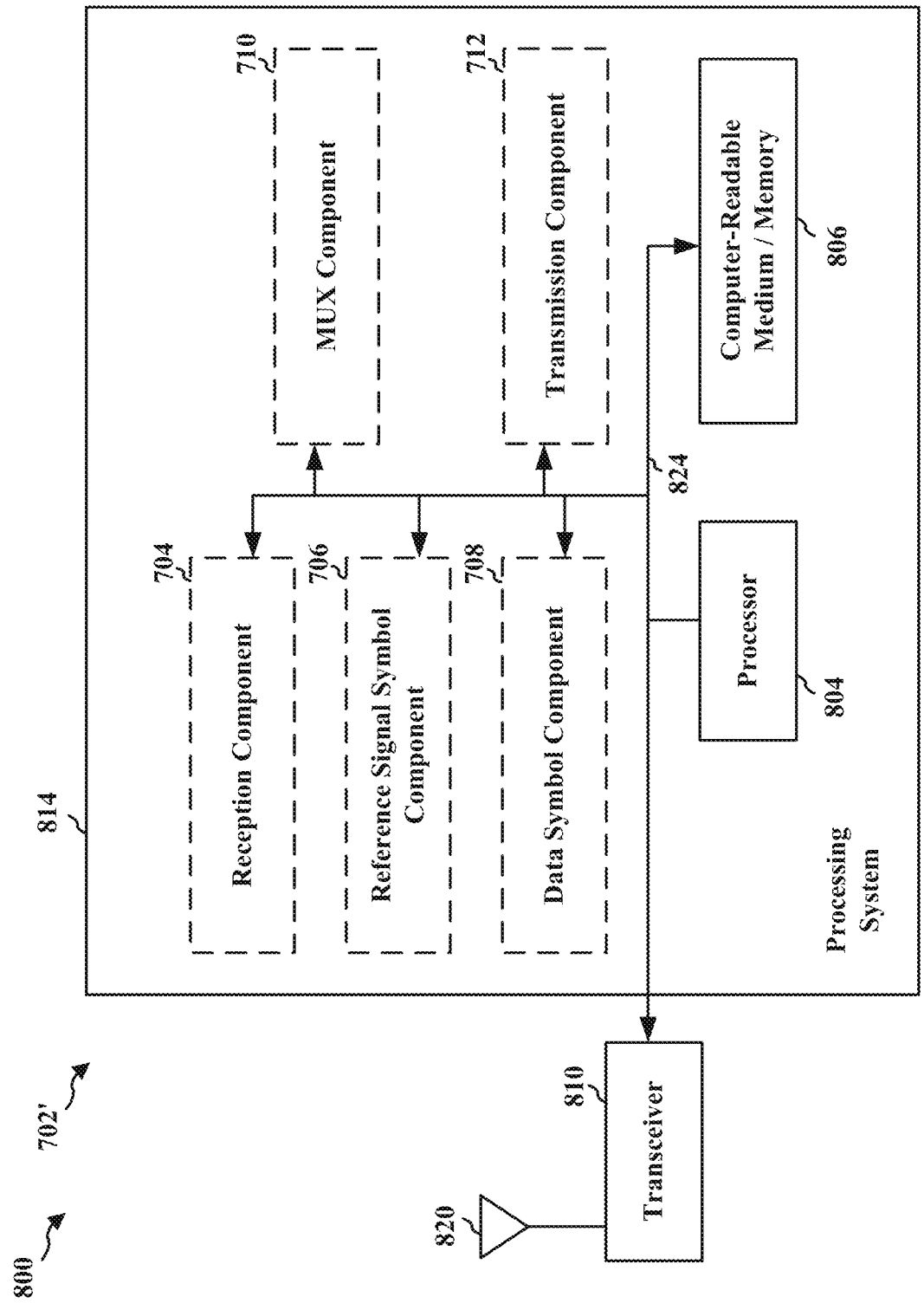
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 712, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In certain configurations, the apparatus 702/702' for wireless communication may include means for generating a reference signal using a base obtained from a table, the table including a plurality of base sequences that each have a PAPR below a threshold or within a range, as described in connection with 602 in FIG. 6. The means may comprise, e.g., reference signal symbol component 706, processor 804, and/or memory 806. In certain other configurations, the apparatus 702/702' for wireless communication may include means for transmitting the reference signal whether or not multiplexed with an uplink transmission to a base station, as described in connection with 606 in FIG. 6. The means may comprise, e.g., transmission component 712, processor 804, and/or memory 806. The apparatus 702/702' may comprise means for multiplexing the reference signal with a data transmission, e.g., as described in connection with 604 in FIG. 6. The means may comprise, e.g., data symbol component 708, MUX component 710, processor 804, and/or memory 806. The aforementioned means may be one or more of the aforementioned components of the apparatus 702 and/or the processing system 814 of the apparatus 702' configured to perform the functions recited by the aforementioned means. As described supra, the processing system 814 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 9:
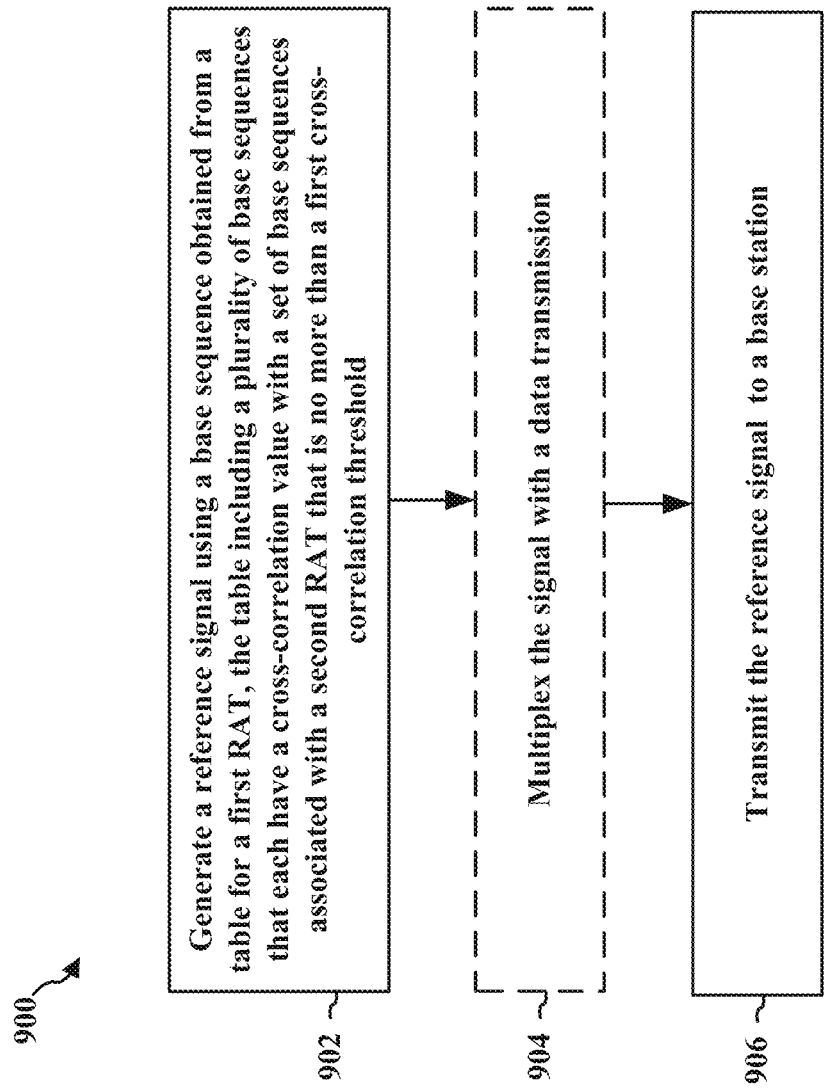
FIG. 9 is a flowchart of a method of wireless communication.

FIG. 9 is a flowchart 900 of a method of wireless communication. The method may be performed by a UE (e.g., the UE 104, 350, 500, the apparatus 1002/1002'). Optional aspects are illustrated with a dashed line. The method may enable a UE to generate a reference signal in a manner that addresses the unique needs of communication systems that may involve high path loss and short ranges, e.g., of mmW based communication. The method may provide a flexible configuration for reference signals having a lower PAPR, cross-correlation, and/or CM. The method 900 may provide benefits in power efficiency and link budget enhancement within a communication system that operate using a mmW frequency band.

At 902, the UE may generate a reference signal using a base sequence using a base sequence obtained from a table for a first RAT, the table including a plurality of base sequences that each have a cross-correlation value with a set of base sequences associated with a second RAT that is no more than a first cross-correlation threshold. In certain aspects, the table may include any of the base sequences that are illustrated in the tables of FIGS. 5C and 5D. The first RAT may comprise NR-based and/or mmW-based communication, and the second RAT may comprise LTE based communication. Additionally and/or alternately, a cross-correlation for each combination of sequences within the table may have a value below a second cross-correlation threshold. Thus, the sequences may have a low cross-correlation with sequences of another RAT, such as LTE, and/or may have a low cross-correlation with the other sequences of the table. As an example, each pairing of base sequences in the plurality of base sequences in the table may have a second intra-RAT cross-correlation value with each other below a second cross-correlation threshold, e.g., with a range of 0.55-0.65, whereas LTE sequences may share an intra-RAT cross-correlation of approximately 0.66.

The table may comprise base sequences having a sequence length of 18, as illustrated in FIG. 5C. The table may comprise base sequences having a sequence length of 30, as illustrated in FIG. 5D. In other examples, the table may comprise base sequences of a different length. The table may comprise at least one pair of sequences comprising a first base sequence along with a symbol-wise reverse of the first base sequence, a symbol-wise conjugate of the first base sequence, and/or a symbol-wise conjugate and reverse of the first base sequence. The plurality of base sequences may represent a set of base sequences including time-cyclic-shifted versions and constant-phase-shifted versions of at least one base sequence in the table.

In certain aspects, the base sequences including all possible base sequence permutations of a first length and the second group of base sequences including all possible base sequence permutations of a second length. For example, for length-18, all length-18 QPSK sequences that agree in the first symbol may be generated.

In one example, the plurality of base sequences comprised in the table include at least the following sequences, or a subset of the following sequences. Additional sequences may also be included in the table.

---

−3, 3, −1, −3, −1, −3, 1, 1, −3, −3, −1, −1, 3, −3, 1, 3, 1, 1;
−3, −3, 1, −3, 3, 3, 3, −1, 3, 1, 1, −3, −3, −3, 3, −3, −1, −1;
−3, 1, −3, −3, 1, −3, −3, 3, 1, −3, −1, −3, −3, −3, −1, 1, 1, 3;
−3, 3, 1, −1, −1, −1, −1, 1, −1, 3, 3, −3, −1, 1, 3, −1, 3, −1;
−3, −3, 1, −1, −1, 1, 1, −3, −1, 3, 3, 3, 3, −1, 3, 1, 3, 1;
−3, −3, 3, 3, −3, 1, 3, −1, −3, 1, −1, −3, 3, −3, −1, −1, −1, 3;
−3, −3, 3, 3, 3, 1, −3, 1, 3, 3, 1, −3, −3, 3, −1, −3, −1, 1;
−3, 3, −1, 1, 3, 1, −3, −1, 1, 1, −3, 1, 3, 3, −1, −3, −3, −3;
−3, 1, −3, −1, −1, 3, 1, −3, −3, −3, −1, −3, −3, 1, 1, 1, −1, −1;
−3, −3, 3, 3, 3, −1, −1, −3, −1, −1, −1, 3, 1, −3, −3, −1, 3, −1;
−3, −1, 3, 3, −1, 3, −1, −3, −1, 1, −1, −3, −1, −1, −1, 3, 3, 1;
−3, −1, −3, −1, −3, 1, 3, −3, −1, 3, 3, 3, 1, −1, −3, 3, −1, −3;
−3, 3, 1, −1, −1, 3, −3, −1, 1, 1, 1, 1, 1, −1, 3, −1, −3, −1;
−3, −1, −1, −3, 1, −3, 3, −1, −1, −3, 3, 3, −3, −1, 3, −1, −1, −1; and
−3, −3, −3, 1, −3, 3, 1, 1, 3, −3, −3, 1, 3, −1, 3, −3, −3, 3.

---

These sequences merely provide an example subset of sequences from the sequences in FIG. 5C. Additional sequences beyond those illustrated above and/or in FIG. 5C may also be comprised in the table.

As well, each of the plurality of base sequences comprised in the table may have a PAPR within a first PAPR range associated with a first RAT, the first PAPR range being lower than a second PAPR range associated with a second set of sequences for a different RAT, as described in connection with FIG. 6. The different RAT may comprise LTE, and the first RAT may comprise NR, e.g. 5G NR. Thus, the table may have sequences sharing a PAPR below that for corresponding sequences used for reference signal generation in LTE, e.g., 1-2 dB less than the PAPR for LTE.

The table of sequences may be generated using any of the aspects described in connection with the examples described for FIG. 6.

At 906, the UE may transmit the reference signal to a base station. The UE may multiplex the reference signal with an uplink transmission, as illustrated at 904, wherein the reference signal is transmitted with the uplink transmission. For example, referring to FIG. 5A, the MUX component 507 may be configured to multiplex and/or combine the reference symbols and the data symbols for transmission in a subframe by the transmitter 509. The transmitter 509 may be configured to transmit the multiplexed reference symbols and the data symbols to a base station 502.

Figure 10:
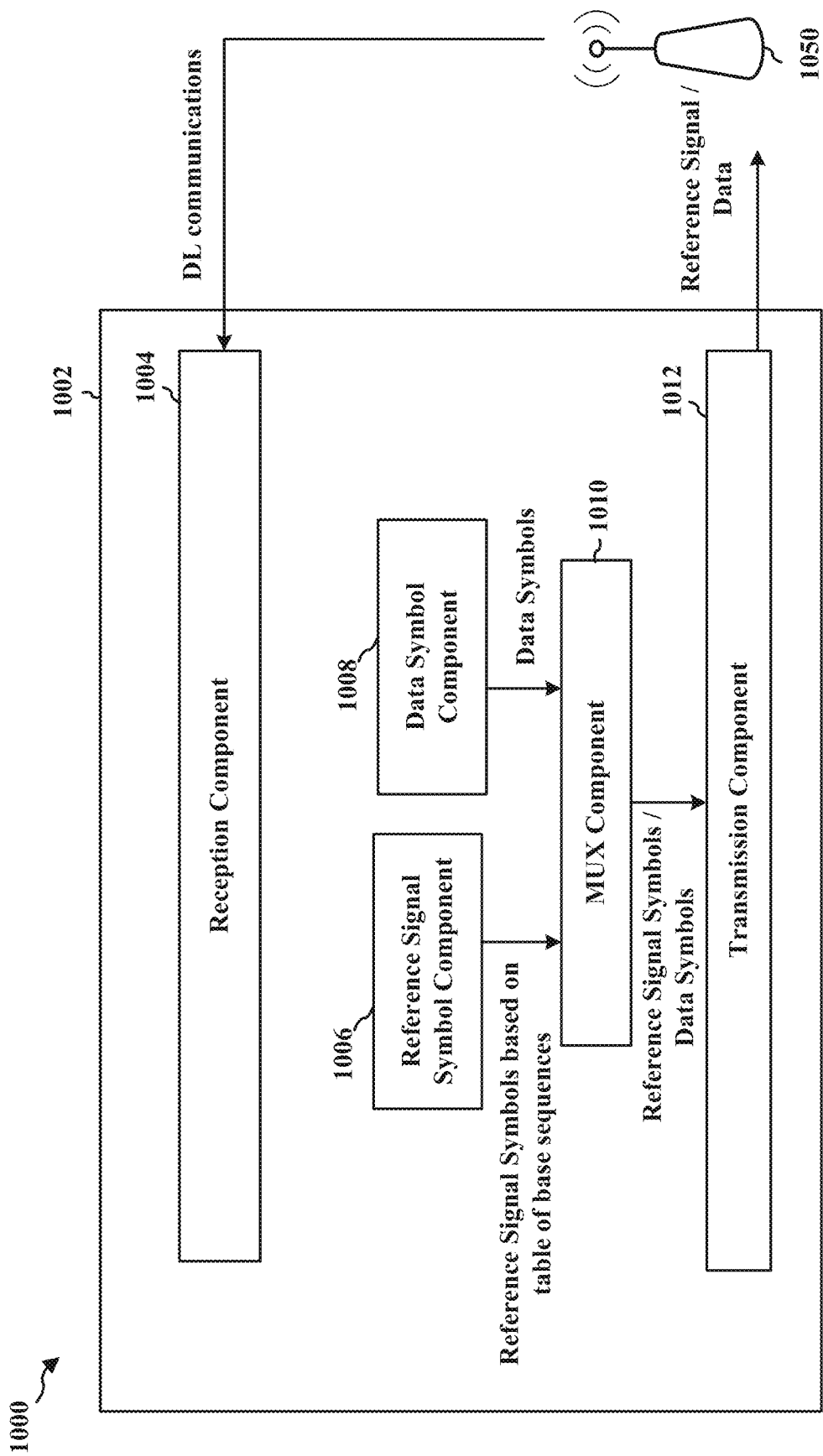
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a UE (e.g., UE 104, 350, 500, the apparatus 1002') in communication with a base station 1050 (e.g., base station 102, 180, 310, 502). The apparatus may include a reception component 1004 configured to receive downlink communication from the base station 1050 and a transmission component 1012 configured to transmit uplink communication to the base station 1050. As described herein, the apparatus may further include a reference signal symbol component 1006, a data symbol component 1008, and/or an MUX component 1010.

In certain aspects, the reference signal symbol component 1006 may be configured to generate a reference signal using a base sequence obtained from a table for a first RAT, the table including a plurality of base sequences that each have a cross-correlation value with a set of base sequences associated with a second RAT that is no more than a first cross-correlation threshold, e.g., as described in connection with 902 in FIG. 9. In certain aspects, the table may include a plurality of base sequences that share additional waveform characteristics. The reference signal symbol component 1006 may be configured to send the generated reference signal symbols to the MUX component 1010. The data symbol component 1008 may be configured to generate data symbols for a UL transmission to the base station 1050. The data symbol component 1008 may be configured to send the data symbols to the MUX component 1010. The MUX component 1010 may be configured to multiplex the data symbols and the reference signal symbols, e.g., in preparation for transmission via transmission component 1012, e.g., as described in connection with 904 in FIG. 6. The MUX component 1010 may be configured to send the multiplex data symbols and reference signal symbols to the transmission component 1012.

The transmission component 1012 may be configured to transmit the reference signal, whether or not multiplexed with the uplink data symbols, to the base station 1050, e.g., as described in connection with 906 in FIG. 9.

In certain other configurations, the reception component 1004 may be configured to receive one or more DL transmissions from the base station 1050.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
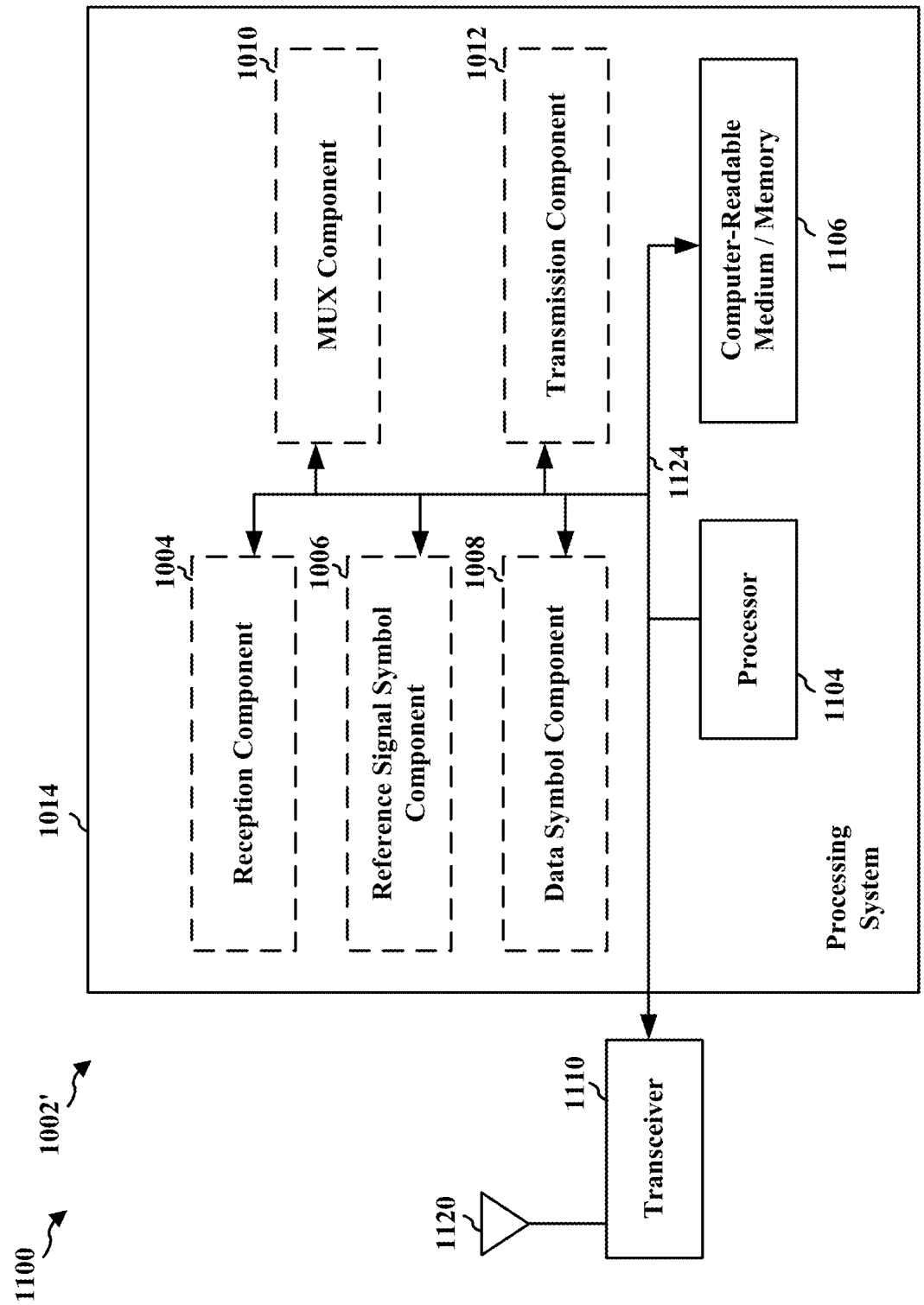
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1012, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication may include means for generating a reference signal using a base obtained from a table for a first RAT, the table including a plurality of base sequences that each have a cross-correlation value with a set of base sequences associated with a second RAT that is no more than a first cross-correlation threshold; as described in connection with 902 in FIG. 9. The means may comprise, e.g., reference signal symbol component 1006, processor 1104, and/or memory 1106. In certain other configurations, the apparatus 1002/1002' for wireless communication may include means for transmitting the reference signal whether or not multiplexed with an uplink transmission to a base station, as described in connection with 906 in FIG. 9. The means may comprise, e.g., transmission component 1012, processor 1104, and/or memory 1106. The apparatus 1002/1002' may comprise means for multiplexing the reference signal with a data transmission, e.g., as described in connection with 904 in FIG. 9. The means may comprise, e.g., data symbol component 1008, MUX component 1010, processor 1104, and/or memory 1106. The aforementioned means may be one or more of the aforementioned components of the apparatus 1002 and/or the processing system 1114 of the apparatus 1002' configured to perform the functions recited by the aforementioned means. As described supra, the processing system 1114 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
    generating a reference signal using a base sequence obtained from a table, the table including a plurality of base sequences that each have a peak-to-average-power ratio (PAPR) below a threshold, wherein each of the plurality of base sequences comprised in the table are associated with a first radio access technology (RAT), and wherein a first sequence set PAPR metric of the plurality of base sequences is lower than a second sequence set PAPR metric associated with a second plurality of base sequences associated with a second RAT different from the first RAT; and
    transmitting the reference signal to a base station.

2. The method of claim 1, wherein the different RAT comprises Long Term Evolution (LTE).

3. The method of claim 2, wherein the first RAT comprises new radio (NR).

4. The method of claim 1, wherein each base sequence has a sequence length of 18.

5. The method of claim 1, wherein the table comprises at least one pair of sequences comprising a first base sequence and at least one of a symbol-wise reverse of the first base sequence, a symbol-wise conjugate of the first base sequence, or a symbol-wise conjugate and reverse of the first base sequence.

6. The method of claim 1, wherein the plurality of base sequences represents a set of base sequences including time-cyclic-shifted versions and constant-phase-shifted versions of at least one base sequence comprised in the table.

7. The method of claim 1, further comprising:
    multiplexing the reference signal with an uplink transmission, wherein the reference signal is transmitted with the uplink transmission.

8. The method of claim 1, wherein each of the plurality of base sequences comprised in the table are associated with a first radio access technology (RAT), and wherein a first cross-correlation value for a first pairing of each of the plurality of base sequences in the table and each base sequence of a set of base sequences associated with a different RAT is no more than a first cross-correlation threshold.

9. The method of claim 8, wherein a second cross-correlation value for each pairing of base sequences in the plurality of base sequences in the table is below a second cross-correlation threshold.

10. The method of claim 1, wherein the plurality of base sequences comprised in the table include at least a subset of:

−3, 3, −1, −3, −1, −3, 1, 1, −3, −3, −1, −1, 3, −3, 1, 3, 1, 1;
−3, −3, 1, −3, 3, 3, 3, −1, 3, 1, 1, −3, −3, −3, 3, −3, −1, −1;
−3, 1, −3, −3, 1, −3, −3, 3, 1, −3, −1, −3, −3, −3, −1, 1, 1, 3;
−3, 3, 1, −1, −1, −1, −1, 1, −1, 3, 3, −3, −1, 1, 3, −1, 3, −1;
−3, −3, 1, −1, −1, 1, 1, −3, −1, 3, 3, 3, −1, 3, 1, 3, 1;
−3, −3, 3, 3, −3, 1, 3, −1, −3, 1, −1, −3, 3, −3, −1, −1, −1, 3;
−3, −3, 3, 3, 3, 1, −3, 1, 3, 3, 1, −3, −3, 3, −1, −3, −1, 1;
−3, 3, −1, 1, 3, 1, −3, −1, 1, 1, −3, 1, 3, 3, −1, −3, −3, −3;
−3, 1, −3, −1, −1, 3, 1, −3, −3, −3, −1, −3, −3, 1, 1, −1, −1;
−3, −3, 3, 3, −1, −1, −3, −1, −1, −1, 3, 1, −3, −3, −1, 3, −1;
−3, −1, 3, 3, −1, 3, −1, −3, −1, 1, −1, −3, −1, −1, −1, 3, 3, 1;
−3, −1, −3, −1, −3, 1, 3, −3, −1, 3, 3, 3, 1, −1, −3, 3, −1, −3;
−3, 3, 1, −1, −1, 3, −3, −1, 1, 1, 1, 1, 1, −1, 3, −1, −3, −1;
−3, −1, −1, −3, 1, −3, 3, −1, −1, −3, 3, 3, −3, −1, 3, −1, −1, −1; and
−3, −3, −3, 1, −3, 3, 1, 1, 3, −3, −3, 1, 3, −1, 3, −3, −3, 3.

11. An apparatus for wireless communication of a user equipment (UE), comprising:
means for generating a reference signal using a base sequence obtained from a table, the table including a plurality of base sequences that each have a peak-to-average-power ratio (PAPR) below a threshold, wherein each of the plurality of base sequences comprised in the table are associated with a first radio access technology (RAT), and wherein a first sequence set PAPR metric of the plurality of base sequences is lower than a second sequence set PAPR metric associated with a second plurality of base sequences associated with a second RAT different from the first RAT; and
means for transmitting the reference signal to a base station.

12. The apparatus of claim 11, wherein the different RAT comprises Long Term Evolution (LTE).

13. The apparatus of claim 12, wherein the first RAT comprises new radio (NR).

14. The apparatus of claim 11, wherein each base sequence has a sequence length of 18.

15. The apparatus of claim 11, wherein the table comprises at least one pair of sequences comprising a first base sequence and at least one of a symbol-wise reverse of the first base sequence, a symbol-wise conjugate of the first base sequence, or a symbol-wise conjugate and reverse of the first base sequence.

16. The apparatus of claim 11, wherein the plurality of base sequences represents a set of base sequences including time-cyclic-shifted versions and constant-phase-shifted versions of at least one base sequence comprised in the table.

17. The apparatus of claim 11, further comprising:
means for multiplexing the reference signal with an uplink transmission, wherein the reference signal is transmitted with the uplink transmission.

18. The apparatus of claim 11, wherein each of the plurality of base sequences comprised in the table are associated with a first radio access technology (RAT), and wherein a first cross-correlation value for a first pairing of each of the plurality of base sequences in the table and each base sequence of a set of base sequences associated with a different RAT is no more than a first cross-correlation threshold.

19. The apparatus of claim 18, wherein a second cross-correlation value for each pairing of base sequences in the plurality of base sequences in the table is below a second cross-correlation threshold.

20. The apparatus of claim 11, wherein the plurality of base sequences comprised in the table include at least a subset of:

−3, 3, −1, −3, −1, −3, 1, 1, −3, −3, −1, −1, 3, −3, 1, 3, 1, 1;
−3, −3, 1, −3, 3, 3, 3, −1, 3, 1, 1, −3, −3, −3, 3, −3, −1, −1;
−3, 1, −3, −3, 1, −3, −3, 3, 1, −3, −1, −3, −3, −3, −1, 1, 1, 3;
−3, 3, 1, −1, −1, −1, −1, 1, −1, 3, 3, −3, −1, 1, 3, −1, 3, −1;
−3, −3, 1, −1, −1, 1, 1, −3, −1, 3, 3, 3, −1, 3, 1, 3, 1;
−3, −3, 3, 3, −3, 1, 3, −1, −3, 1, −1, −3, 3, −3, −1, −1, −1, 3;
−3, −3, 3, 3, 3, 1, −3, 1, 3, 3, 1, −3, −3, 3, −1, −3, −1, 1;
−3, 3, −1, 1, 3, 1, −3, −1, 1, 1, −3, 1, 3, 3, −1, −3, −3, −3;
−3, 1, −3, −1, −1, 3, 1, −3, −3, −3, −1, −3, −3, 1, 1, −1, −1;
−3, −3, 3, 3, −1, −1, −3, −1, −1, −1, 3, 1, −3, −3, −1, 3, −1;
−3, −1, 3, 3, −1, 3, −1, −3, −1, 1, −1, −3, −1, −1, −1, 3, 3, 1;
−3, −1, −3, −1, −3, 1, 3, −3, −1, 3, 3, 3, 1, −1, −3, 3, −1, −3;
−3, 3, 1, −1, −1, 3, −3, −1, 1, 1, 1, 1, 1, −1, 3, −1, −3, −1;
−3, −1, −1, −3, 1, −3, 3, −1, −1, −3, 3, 3, −3, −1, 3, −1, −1, −1; and
−3, −3, −3, 1, −3, 3, 1, 1, 3, −3, −3, 1, 3, −1, 3, −3, −3, 3.

21. An apparatus for wireless communication of a user equipment (UE), comprising:
a memory;
at least one processor coupled to the memory and configured to:
generate a reference signal using a base sequence obtained from a table, the table including a plurality of base sequences that each have a peak-to-average-power ratio (PAPR) below a threshold, wherein each of the plurality of base sequences comprised in the table are associated with a first radio access technology (RAT), and wherein a first sequence set PAPR metric of the plurality of base sequences is lower than a second sequence set PAPR metric associated with a second plurality of base sequences associated with a second RAT different from the first RAT; and
transmit the reference signal to a base station.

22. The apparatus of claim 21, wherein the different RAT comprises Long Term Evolution (LTE).

23. The apparatus of claim 21, wherein the first RAT comprises new radio (NR).

24. The apparatus of claim 21, wherein each base sequence has a sequence length of 18.

25. The apparatus of claim 21, wherein the table comprises at least one pair of sequences comprising a first base sequence and at least one of a symbol-wise reverse of the first base sequence, a symbol-wise conjugate of the first base sequence, or a symbol-wise conjugate and reverse of the first base sequence.

26. The apparatus of claim 21, wherein the plurality of base sequences represents a set of base sequences including time-cyclic-shifted versions and constant-phase-shifted versions of at least one base sequence comprised in the table.

27. The apparatus of claim 21, wherein the at least one processor is further configured to:
multiplex the reference signal with an uplink transmission, wherein the reference signal is transmitted with the uplink transmission.

28. The apparatus of claim 21, wherein each of the plurality of base sequences comprised in the table are associated with a first radio access technology (RAT), and wherein a first cross-correlation value for a first pairing of each of the plurality of base sequences in the table and each base sequence of a set of base sequences associated with a different RAT is no more than a first cross-correlation threshold.

29. The apparatus of claim 28, wherein a second cross-correlation value for each pairing of base sequences in the plurality of base sequences in the table is below a second cross-correlation threshold.

30. The apparatus of claim 21, wherein the plurality of base sequences comprised in the table include at least a subset of:

---

−3, 3, −1, −3, −1, −3, 1, 1, −3, −3, −1, −1, 3, −3, 1, 3, 1, 1;
−3, −3, 1, −3, 3, 3, 3, −1, 3, 1, 1, −3, −3, −3, 3, −3, −1, −1;
−3, 1, −3, −3, 1, −3, −3, 3, 1, −3, −1, −3, −3, −3, −1, 1, 1, 3;
−3, 3, 1, −1, −1, −1, −1, 1, −1, 3, 3, −3, −1, 1, 3, −1, 3, −1;
−3, −3, 1, −1, −1, 1, 1, −3, −1, 3, 3, 3, 3, −1, 3, 1, 3, 1;
−3, −3, 3, 3, −3, 1, 3, −1, −3, 1, −1, −3, 3, −3, −1, −1, −1, 3;
−3, −3, 3, 3, 3, 1, −3, 1, 3, 3, 1, −3, −3, 3, −1, −3, −1, 1;
−3, 3, −1, 1, 3, 1, −3, −1, 1, 1, −3, 1, 3, 3, −1, −3, −3, −3;
−3, 1, −3, −1, −1, 3, 1, −3, −3, −3, −1, −3, −3, 3, 1, 1, −1, −1;
−3, −3, 3, 3, 3, −1, −1, −3, −1, −1, −1, 3, 1, −3, −3, −1, 3, −1;
−3, −1, 3, 3, −1, 3, −1, −3, −1, 1, −1, −3, −1, −1, −1, 3, 3, 1;
−3, −1, −3, −1, −3, 1, 3, −3, −1, 3, 3, 3, 1, −1, −3, 3, −1, −3;
−3, 3, 1, −1, −1, 3, −3, −1, 1, 1, 1, 1, 1, −1, 3, −1, −3, −1;
−3, −1, −1, −3, 1, −3, 3, −1, −1, −3, 3, 3, −3, −1, 3, −1, −1, −1; and
−3, −3, −3, 1, −3, 3, 1, 1, 3, −3, −3, 1, 3, −1, 3, −3, −3, 3.

---

31. A non-transitory computer-readable medium storing computer executable code of a user equipment (UE), comprising code instructing one or more processors to:
generate a reference signal using a base sequence obtained from a table, the table including a plurality of base sequences that each have a peak-to-average-power ratio (PAPR) below a threshold, wherein each of the plurality of base sequences comprised in the table are associated with a first radio access technology (RAT), and wherein a first sequence set PAPR metric of the plurality of base sequences is lower than a second sequence set PAPR metric associated with a second plurality of base sequences associated with a second RAT different from the first RAT; and
transmit the reference signal to a base station.

32. The computer-readable medium of claim 31, wherein the different RAT comprises Long Term Evolution (LTE).

33. The computer-readable medium of claim 32, wherein the first RAT comprises new radio (NR).

34. The computer-readable medium of claim 31, wherein each base sequence has a sequence length of 18.

35. The computer-readable medium of claim 31, wherein the table comprises at least one pair of sequences comprising a first base sequence and at least one of a symbol-wise reverse of the first base sequence, a symbol-wise conjugate of the first base sequence, or a symbol-wise conjugate and reverse of the first base sequence.

36. The computer-readable medium of claim 31, wherein the plurality of base sequences represents a set of base sequences including time-cyclic-shifted versions and constant-phase-shifted versions of at least one base sequence comprised in the table.

37. The computer-readable medium of claim 31, further comprising code instructing the one or more processors to:
multiplex the reference signal with an uplink transmission, wherein the reference signal is transmitted with the uplink transmission.

38. The computer-readable medium of claim 31, wherein each of the plurality of base sequences comprised in the table are associated with a first radio access technology (RAT), and wherein a first cross-correlation value for a first pairing of each of the plurality of base sequences in the table and each base sequence of a set of base sequences associated with a different RAT is no more than a first cross-correlation threshold.

39. The computer-readable medium of claim 38, wherein a second cross-correlation value for each pairing of base sequences in the plurality of base sequences in the table is below a second cross-correlation threshold.

40. The computer-readable medium of claim 31, wherein the plurality of base sequences comprised in the table include at least a subset of:

---

−3, 3, −1, −3, −1, −3, 1, 1, −3, −3, −1, −1, 3, −3, 1, 3, 1, 1;
−3, −3, 1, −3, 3, 3, 3, −1, 3, 1, 1, −3, −3, −3, 3, −3, −1, −1;
−3, 1, −3, −3, 1, −3, −3, 3, 1, −3, −1, −3, −3, −3, −1, 1, 1, 3;
−3, 3, 1, −1, −1, −1, −1, 1, −1, 3, 3, −3, −1, 1, 3, −1, 3, −1;
−3, −3, 1, −1, −1, 1, 1, −3, −1, 3, 3, 3, 3, −1, 3, 1, 3, 1;
−3, −3, 3, 3, −3, 1, 3, −1, −3, 1, −1, −3, 3, −3, −1, −1, −1, 3;
−3, −3, 3, 3, 3, 1, −3, 1, 3, 3, 1, −3, −3, 3, −1, −3, −1, 1;
−3, 3, −1, 1, 3, 1, −3, −1, 1, 1, −3, 1, 3, 3, −1, −3, −3, −3;
−3, 1, −3, −1, −1, 3, 1, −3, −3, −3, −1, −3, −3, 3, 1, 1, −1, −1;
−3, −3, 3, 3, 3, −1, −1, −3, −1, −1, −1, 3, 1, −3, −3, −1, 3, −1;
−3, −1, 3, 3, −1, 3, −1, −3, −1, 1, −1, −3, −1, −1, −1, 3, 3, 1;
−3, −1, −3, −1, −3, 1, 3, −3, −1, 3, 3, 3, 1, −1, −3, 3, −1, −3;
−3, 3, 1, −1, −1, 3, −3, −1, 1, 1, 1, 1, 1, −1, 3, −1, −3, −1;
−3, −1, −1, −3, 1, −3, 3, −1, −1, −3, 3, 3, −3, −1, 3, −1, −1, −1; and
−3, −3, −3, 1, −3, 3, 1, 1, 3,−3, −3, 1, 3, −1, 3, −3, −3, 3.

---

41. A method of wireless communication for a user equipment (UE), comprising:
generating a reference signal using a base sequence obtained from a table, the table including a plurality of base sequences that each have a peak-to-average-power ratio (PAPR) below a threshold; and
transmitting the reference signal to a base station,
wherein the plurality of base sequences comprised in the table include at least a subset of:

---

−3, 3, −1, −3, −1, −3, 1, 1, −3, −3, −1, −1, 3, −3, 1, 3, 1, 1;
−3, −3, 1, −3, 3, 3, 3, −1, 3, 1, 1, −3, −3, −3, 3, −3, −1, −1;
−3, 1, −3, −3, 1, −3, −3, 3, 1, −3, −1, −3, −3, −3, −1, 1, 1, 3;
−3, 3, 1, −1, −1, −1, −1, 1, −1, 3, 3, −3, −1, 1, 3, −1, 3, −1;
−3, −3, 1, −1, −1, 1, 1, −3, −1, 3, 3, 3, 3, −1, 3, 1, 3, 1;
−3, −3, 3, 3, −3, 1, 3, −1, −3, 1, −1, −3, 3, −3, −1, −1, −1, 3;
−3, −3, 3, 3, 3, 1, −3, 1, 3, 3, 1, −3, −3, 3, −1, −3, −1, 1;
−3, 3, −1, 1, 3, 1, −3, −1, 1, 1, −3, 1, 3, 3, −1, −3, −3, −3;
−3, 1, −3, −1, −1, 3, 1, −3, −3, −3, −1, −3, −3, 3, 1, 1, −1, −1;
−3, −3, 3, 3, 3, −1, −1, −3, −1, −1, −1, 3, 1, −3, −3, −1, 3, −1;
−3, −1, 3, 3, −1, 3, −1, −3, −1, 1, −1, −3, −1, −1, −1, 3, 3, 1;
−3, −1, −3, −1, −3, 1, 3, −3, −1, 3, 3, 3, 1, −1, −3, 3, −1, −3;
−3, 3, 1, −1, −1, 3, −3, −1, 1, 1, 1, 1, 1, −1, 3, −1, −3, −1;
−3, −1, −1, −3, 1, −3, 3, −1, −1, −3, 3, 3, −3, −1, 3, −1, −1, −1; and
−3, −3, −3, 1, −3, 3, 1, 1, 3, −3, −3, 1, 3, −1, 3, −3, −3, 3.

---

42. An apparatus for wireless communication of a user equipment (UE), comprising:
means for generating a reference signal using a base sequence obtained from a table, the table including a plurality of base sequences; and
means for transmitting the reference signal to a base station,
wherein the plurality of base sequences comprised in the table include at least a subset of:

---

−3, 3, −1, −3, −1, −3, 1, 1, −3, −3, −1, −1, 3, −3, 1, 3, 1, 1;
−3, −3, 1, −3, 3, 3, 3, −1, 3, 1, 1, −3, −3, −3, 3, −3, −1, −1;

-continued

-3, 1, -3, -3, 1, -3, -3, 3, 1, -3, -1, -3, -3, -3, -1, 1, 1, 3;
-3, 3, 1, -1, -1, -1, -1, 1, -1, 3, 3, -3, -1, 1, 3, -1, 3, -1;
-3, -3, 1, -1, -1, 1, 1, -3, -1, 3, 3, 3, 3, -1, 3, 1, 3, 1;
-3, -3, 3, 3, -3, 1, 3, -1, -3, 1, -1, -3, 3, -3, -1, -1, -1, 3;
-3, -3, 3, 3, 1, -3, 1, 3, 3, 1, -3, -3, 3, -1, -3, -1, 1;
-3, 3, -1, 1, 3, 1, -3, -1, 1, 1, -3, 1, 3, 3, -1, -3, -3, -3;
-3, 1, -3, -1, -1, 3, 1, -3, -3, -3, -1, -3, -3, 1, 1, 1, -1, -1;
-3, -3, 3, 3, 3, -1, -1, -3, -1, -1, -1, 3, 1, -3, -3, -1, 3, -1;
-3, -1, 3, 3, -1, 3, -1, -3, -1, 1, -1, -3, -1, -1, -1, 3, 3, 1;
-3, -1, -3, -1, -3, 1, 3, -3, -1, 3, 3, 3, 1, -1, -3, 3, -1, -3;
-3, 3, 1, -1, -1, 3, -3, -1, 1, 1, 1, 1, 1, -1, 3, -1, -3, -1;
-3, -1, -1, -3, 1, -3, 3, -1, -1, -3, 3, 3, -3, -1, 3, -1, -1, -1; and
-3, -3, -3, 1, -3, 3, 1, 1, 3, -3, -3, 1, 3, -1, 3, -3, -3, 3.

43. An apparatus for wireless communication of a user equipment (UE), comprising:
a memory;
at least one processor coupled to the memory and configured to:
generate a reference signal using a base sequence obtained from a table, the table including a plurality of base sequences; and
transmit the reference signal to a base station,
wherein the plurality of base sequences comprised in the table include at least a subset of:

-3, 3, -1, -3, -1, -3, 1, 1, -3, -3, -1, -1, 3, -3, 1, 3, 1, 1;
-3, -3, 1, -3, 3, 3, 3, -1, 3, 1, 1, -3, -3, -3, 3, -3, -1, -1;
-3, 1, -3, -3, 1, -3, -3, 3, 1, -3, -1, -3, -3, -3, -1, 1, 1, 3;
-3, 3, 1, -1, -1, -1, -1, 1, -1, 3, 3, -3, -1, 1, 3, -1, 3, -1;
-3, 3, 1, -1, -1, 1, 1, -3, -1, 3, 3, 3, 3, -1, 3, 1, 3, 1;
-3, -3, 3, 3, -3, 1, 3, -1, -3, 1, -1, -3, 3, -3, -1, -1, -1, 3;
-3, -3, 3, 3, 3, 1, -3, 1, 3, 3, 1, -3, -3, 3, -1, 3, -1, 1;
-3, 3, -1, 1, 3, 1, -3, -1, 1, 1, -3, 1, 3, 3, -1, -3, -3, -3;
-3, 1, -3, -1, -1, 3, 1, -3, -3, -3, -1, -3, -3, 1, 1, 1, -1, -1;
-3, -3, 3, 3, 3, -1, -1, -3, -1, -1, -1, 3, 1, -3, -3, -1, 3, -1;
-3, -1, 3, 3, -1, 3, -1, -3, -1, 1, -1, -3, -1, -1, -1, 3, 3, 1;
-3, -1, -3, -1, -3, 1, 3, -3, -1, 3, 3, 3, 1, -1, -3, 3, -1, -3;
-3, 3, 1, -1, -1, 3, -3, -1, 1, 1, 1, 1, 1, -1, 3, -1, -3, -1;
-3, -1, -1, -3, 1, -3, 3, -1, -1, -3, 3, 3, -3, -1, 3, -1, -1, -1; and
-3, -3, -3, 1, -3, 3, 1, 1, 3, -3, -3, 1, 3, -1, 3, -3, -3, 3.

44. A non-transitory computer-readable medium storing computer executable code of a user equipment (UE), comprising code instructing one or more processors to:
generate a reference signal using a base sequence obtained from a table, the table including a plurality of base sequences; and transmit the reference signal to a base station,
wherein the plurality of base sequences comprised in the table include at least a subset of:

-3, 3, -1, -3, -1, -3, 1, 1, -3, -3, -1, -1, 3, -3, 1, 3, 1, 1;
-3, -3, 1, -3, 3, 3, 3, -1, 3, 1, 1, -3, -3, -3, 3, -3, -1, -1;
-3, 1, -3, -3, 1, -3, -3, 3, 1, -3, -1, -3, -3, -3, -1, 1, 1, 3;
-3, 3, 1, -1, -1, -1, -1, 1, -1, 3, 3, -3, -1, 1, 3, -1, 3, -1;
-3, -3, 1, -1, -1, 1, 1, -3, -1, 3, 3, 3, 3, -1, 3, 1, 3, 1;
-3, -3, 3, 3, -3, 1, 3, -1, -3, 1, -1, -3, 3, -3, -1, -1, -1, 3;
-3, -3, 3, 3, 3, 1, -3, 1, 3, 3, 1, -3, -3, 3, -1, -3, -1, 1;
-3, 3, -1, 1, 3, 1, -3, -1, 1, 1, -3, 1, 3, 3, -1, -3, -3, -3;
-3, 1, -3, -1, -1, 3, 1, -3, -3, -3, -1, -3, -3, 1, 1, 1, -1, -1;
-3, -3, 3, 3, 3, -1, -1, -3, -1, -1, -1, 3, 1, -3, -3, -1, 3, -1;
-3, -1, 3, 3, -1, 3, -1, -3, -1, 1, -1, -3, -1, -1, -1, 3, 3, 1;
-3, -1, -3, -1, -3, 1, 3, -3, -1, 3, 3, 3, 1, -1, -3, 3, -1, -3;
-3, 3, 1, -1, -1, 3, -3, -1, 1, 1, 1, 1, 1, -1, 3, -1, -3, -1;
-3, -1, -1, -3, 1, -3, 3, -1, -1, -3, 3, 3, -3, -1, 3, -1, -1, -1; and
-3, -3, -3, 1, -3, 3, 1, 1, 3, -3, -3, 1, 3, -1, 3, -3, -3, 3.

45. A method of wireless communication for a user equipment (UE), comprising:
generating a reference signal using a base sequence obtained from a table, the table including a plurality of base sequences; and
transmitting the reference signal to a base station,
wherein the plurality of base sequences comprised in the table include at least a subset of:

-3, 3, -1, -3, -1, -3, 1, 1, -3, -3, -1, -1, 3, -3, 1, 3, 1, 1;
-3, -3, 1, -3, 3, 3, 3, -1, 3, 1, 1, -3, -3, -3, 3, -3, -1, -1;
-3, 1, -3, -3, 1, -3, -3, 3, 1, -3, -1, -3, -3, -3, -1, 1, 1, 3;
-3, 3, 1, -1, -1, -1, -1, 1, -1, 3, 3, -3, -1, 1, 3, -1, 3, -1;
-3, -3, 1, -1, -1, 1, 1, -3, -1, 3, 3, 3, 3, -1, 3, 1, 3, 1;
-3, -3, 3, 3, -3, 1, 3, -1, -3, 1, -1, -3, 3, -3, -1, -1, -1, 3;
-3, -3, 3, 3, 3, 1, -3, 1, 3, 3, 1, -3, -3, 3, -1, -3, -1, 1;
-3, 3, -1, 1, 3, 1, -3, -1, 1, 1, -3, 1, 3, 3, -1, -3, -3, -3;
-3, 1, -3, -1, -1, 3, 1, -3, -3, -3, -1, -3, -3, 1, 1, 1, -1, -1;
-3, -3, 3, 3, 3, -1, -1, -3, -1, -1, -1, 3, 1, -3, -3, -1, 3, -1;
-3, -1, 3, 3, -1, 3, -1, -3, -1, 1, -1, -3, -1, -1, -1, 3, 3, 1;
-3, -1, -3, -1, -3, 1, 3, -3, -1, 3, 3, 3, 1, -1, -3, 3, -1, -3;
-3, 3, 1, -1, -1, 3, -3, -1, 1, 1, 1, 1, 1, -1, 3, -1, -3, -1;
-3, -1, -1, -3, 1, -3, 3, -1, -1, -3, 3, 3, -3, -1, 3, -1, -1, -1; and
-3, -3, -3, 1, -3, 3, 1, 1, 3, -3, -3, 1, 3, -1, 3, -3, -3, 3.

* * * * *